(12) United States Patent
Hangaard et al.

(10) Patent No.: US 8,573,958 B2
(45) Date of Patent: Nov. 5, 2013

(54) IMPROVEMENTS FOR RAPID PROTOTYPING APPARATUS

(75) Inventors: Ole Hangaard, Skanderborg (DK); Niels Holm Larsen, Allschwill (CH); Emilie Pougeoise, Grenoble (FR); Jèrôme Grelin, St. Louis (FR)

(73) Assignee: 3D Systems, Inc., Rock Hill, SC (US)

( * ) Notice: Subject to any disclaimer, the term of this patent is extended or adjusted under 35 U.S.C. 154(b) by 213 days.

(21) Appl. No.: 13/124,197

(22) PCT Filed: Oct. 9, 2009
(Under 37 CFR 1.47)

(86) PCT No.: PCT/EP2009/063158
§ 371 (c)(1),
(2), (4) Date: Sep. 6, 2011

(87) PCT Pub. No.: WO2010/043557
PCT Pub. Date: Apr. 22, 2010

(65) Prior Publication Data
US 2011/0313560 A1    Dec. 22, 2011

(30) Foreign Application Priority Data

Oct. 17, 2008    (EP) .................................... 08018226

(51) Int. Cl.
*B29C 35/08*    (2006.01)

(52) U.S. Cl.
USPC .................... 425/174.4; 425/385; 264/401

(58) Field of Classification Search
USPC ................... 425/174.4, 385; 264/401
See application file for complete search history.

(56) References Cited

U.S. PATENT DOCUMENTS

| | | | |
|---|---|---|---|
| 6,500,378 B1* | 12/2002 | Smith | 264/401 |
| 6,529,265 B1 | 3/2003 | Henningsen | |
| 7,128,866 B1 | 10/2006 | Henningsen | |
| 7,903,049 B2 | 3/2011 | Henningsen | |
| 7,989,839 B2* | 8/2011 | Dahm | 257/99 |
| 2003/0052105 A1 | 3/2003 | Nagano et al. | |
| 2005/0152146 A1* | 7/2005 | Owen et al. | 362/294 |
| 2008/0157412 A1 | 7/2008 | Kihara et al. | |
| 2008/0259228 A1 | 10/2008 | Henningsen | |
| 2008/0259306 A1 | 10/2008 | Henningsen | |

FOREIGN PATENT DOCUMENTS

| | | |
|---|---|---|
| WO | WO 98/47042 | 10/1998 |
| WO | WO 98/47048 | 10/1998 |
| WO | WO 00/21735 | 4/2000 |

\* cited by examiner

*Primary Examiner* — James Sanders

(57) ABSTRACT

A stereolithography apparatus and an exposure system for a stereolithography apparatus, wherein light emitting diodes are used as light sources. The invention relates to aligning light from the light emitting diode and to the exchange and control of the light emitting diodes.

8 Claims, 12 Drawing Sheets

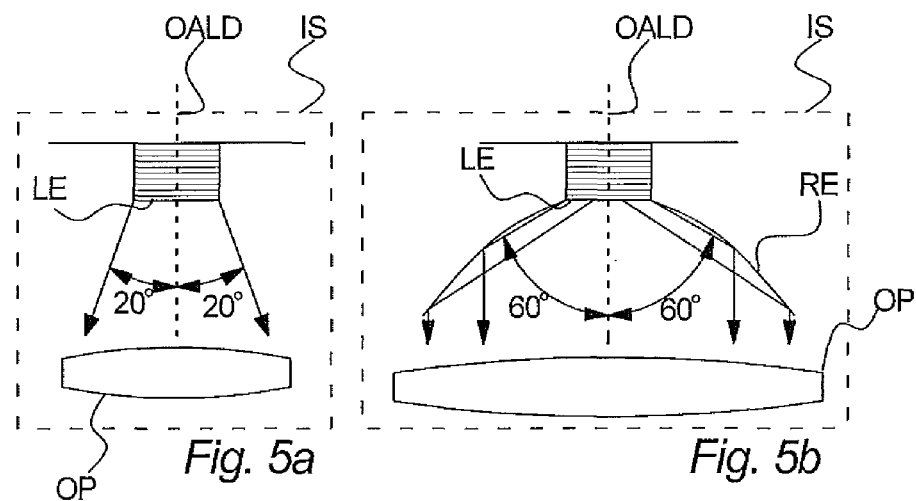
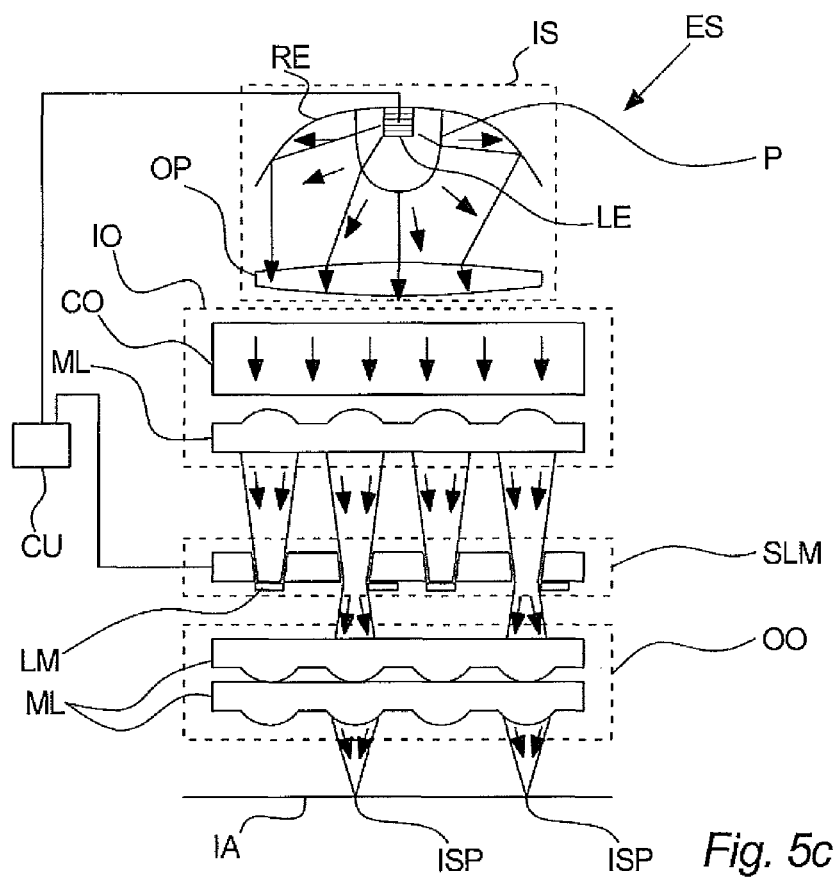
Fig. 5a Fig. 5b
Fig. 5c

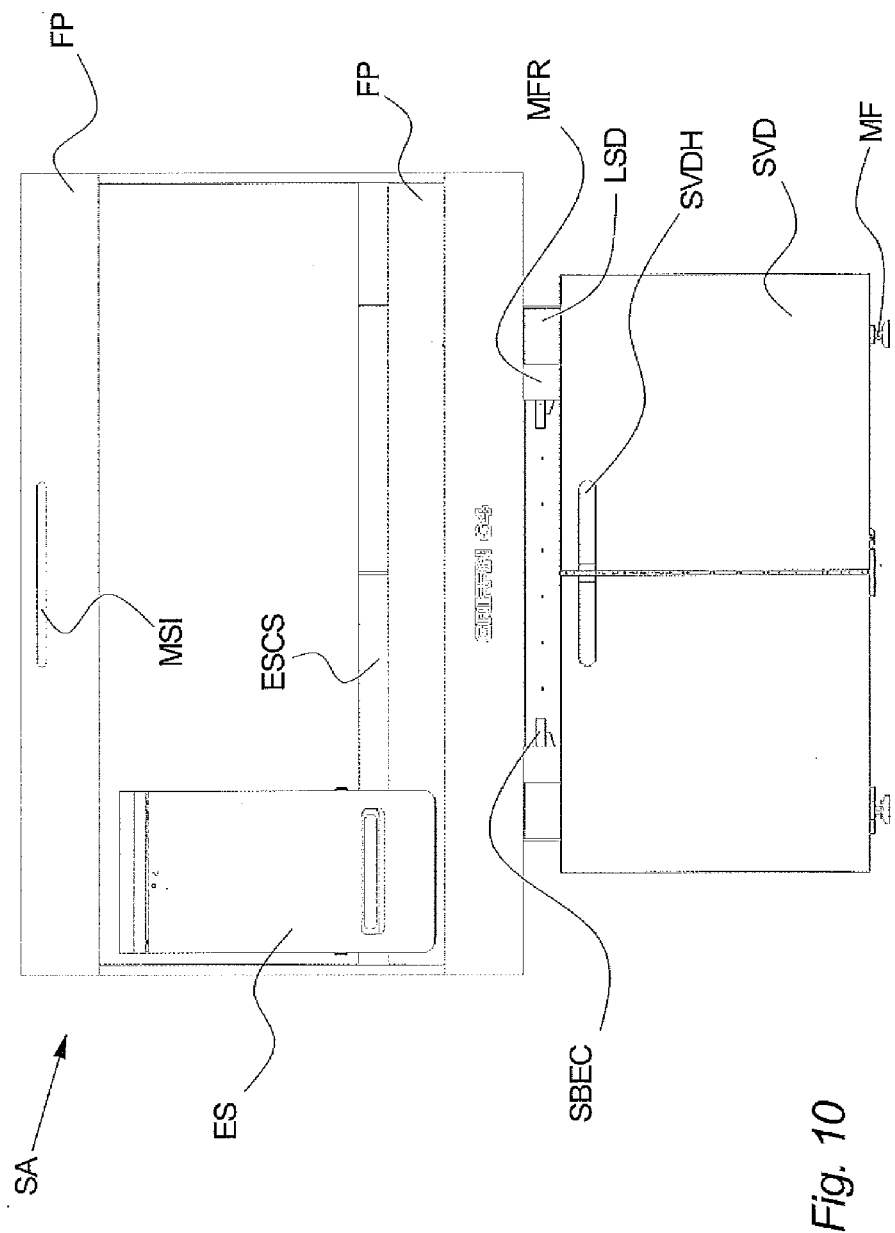

IMPROVEMENTS FOR RAPID PROTOTYPING APPARATUS

CROSS REFERENCE TO RELATED APPLICATIONS

This application is the National Phase of International Application PCT/EP2009/063158 filed Oct. 9, 2009 which designated the U.S. and which claims priority to patent applications (EP) 08018226.4 filed Oct. 17, 2008 and PCT/EP2008/066644 filed Dec. 2, 2008. The noted applications are incorporated herein by reference.

CROSS-REFERENCE TO RELATED APPLICATIONS

1. Field of the Invention

The invention relates to improvements relating to a rapid prototyping apparatus for the manufacturing of three-dimensional objects by additive treatment of cross-sections.

2. Background of the Invention

Apparatuses for use in stereolithography have been developed over the recent years. They now include both UV-light bulbs and light emitting diodes as light sources. Implementing light emitting diodes as light source leads to different problems, which are dealt with in this application.

SUMMARY OF THE INVENTION

The invention relates to an exposure system for a stereolithography apparatus comprising at least one light emitting diode emitting light with a wavelength between 200 and 10000 nm, at least one spatial light modulator, with a plurality of individually controllable light modulators, input optics optically coupled to said at least one spatial light modulator, output optics optically coupled to said at least one spatial light modulator, at least one control unit, wherein said input optics and output optics facilitates transmission of light emitted from said at least one light emitting diode via said individually controllable light modulators of said spatial light modulator to an illumination area, wherein said spatial light modulator enables an establishment of a pattern of the light from said input optics, according to control signals from said control unit, wherein said output optics enable focusing of the pattern of light from said at least one spatial light modulator onto an illumination spot, and wherein said exposure system is capable to align light emitted from said light emitting diode at an angle above 45 degrees with respect to the optical axis of the light emitting diode, so as to direct such light in a direction parallel with respect to the optical axis.

The emitting diodes of the present invention can emit radiation in the range from deep UV to far IR, e.g. from 200 nm to 100000 nm. The term light applies therefore to radiation in the range from deep UV to far IR, e.g. from 200 nm to 100000 nm. Applications like powder sintering of materials to produce 3 dimensional solid objects are preferably carried out in the infra red energy range with wavelength up to 100000 nm. Applications using stereolithographic baths of curable liquid resins are preferably carried out in the ultra violet energy range with wavelength from 200 nm up to 500 nm.

According to an advantageous aspect of the invention the light modulators of the spatial light modulator pattern the light from the light emitting diodes onto the light-sensitive material. The light-sensitive material is cured in a pattern reflecting the position of the light modulators in the spatial light modulator. The more light from the light emitting diode is directed towards the light-sensitive material, the more control options are available when controlling the stereolithography apparatus. Such control options may e.g. be the scanning speed of the exposure system across the light-sensitive material, energy consumption control e.g. lowering the intensity of light from the light emitting diodes resulting in a reduced consumption of energy, etc.

According to a further advantageous aspect of the invention the exposure system comprises modules of spatial light modulators, wherein each module comprises more than one spatial light modulator.

Furthermore the input optics may be made of modules, hence one input optic module corresponds to one module of spatial light modulators.

Furthermore the output optics may be made of modules, hence one output optic module corresponds to one module of spatial light modulators.

The modular structure of the elements of the exposure system facilitates easy modification of the exposure system to meet specific user defined requests to the size for the exposure system.

According to a further advantageous aspect of the invention more than one spatial light modulator are used to increase the width of the exposure system, thereby increasing the area which is possible to illuminate; hence it is possible to build larger object or a larger number of small objects at the same time.

According to a further advantageous aspect of the invention more than one light emitting diode is used to increase the intensity of the emitted light from the exposure system. With an increased intensity of light it is possible to increase the scanning speed of the exposure system across the light-sensitive material According to a further advantageous aspect of the invention the spatial light modulator used to pattern the light from the light emitting diode may be equivalent to a micro light switch, a liquid crystal display, a digital micro mirror device etc.

According to a further advantageous aspect of the invention the light emitting diode may be equivalent to a laser diode, an ultra violet light emitting diode, etc. Furthermore any future developed diode or light source comparable to a light emitting diode may be used.

According to a further advantageous aspect of the invention light is understood as any electromagnetic wave.

In an embodiment of the invention said exposure system comprises means for directional alignment of the part of the light emitted from said at least one light emitting diode with an angle above 45 degrees with respect to the optical axis of said at least one light emitting diode, so as to change the direction of said light in such a way that the angle of said aligned light with respect to the optical axis of said at least one light emitting diode is 1.5 degrees or lower.

According to an advantageous embodiment of the invention the result of the aligning of light emitted from the light emitting diode is measured in the input optics between the collimation optics and the micro lenses.

According to an advantageous embodiment of the invention it may be very advantageous to be able to direct, reflect or align light emitted from the light emitting diode into a direction where the angle to the optical axis of the light emitting diode is less than when the light is emitted from the light emitting diode. This may make easier the further handling of light e.g. in the input optics.

In an embodiment of the invention said exposure system comprises means for alignment of the light emitted from said at least one light emitting diode before said light is introduced into the input optics.

According to an advantageous embodiment of the invention light emitted from the light emitting diode is directionally aligned so that the light is at least partly emitted in the same direction. This is essential according to an embodiment of the invention because the more of the light emitted from the light emitting diode that is directed to the light emitting material, the faster the exposure system may be scanned across the light-sensitive material.

In an embodiment of the invention said means for alignment of the light emitted from said at least one light emitting diode comprises at least one reflector.

According to an advantageous embodiment of the invention the light emitting diode may be used in connection with an external reflector intended for optimizing the light emitted from the light emitting diode. When using a reflector more of the emitted light can be directed towards the input optics and hence from the same light emitting diode more intensity of light may be applied to the input optics.

According to a further advantageous embodiment of the invention the light emitting diode may be provided with an internally located reflector. As for the case with the external reflector, a light emitting diode with an internal reflector may increase the part of the emitted light directed towards the input optics and hence towards the illumination spot on the surface of the light-sensitive material.

According to a further advantageous embodiment of the invention a reflector is used in relation to the light emitting diode to increase the efficiency of the light emitting diode and hence the upper limit of the scanning speed of the exposure system across the light-sensitive material.

In an embodiment of the invention said means for alignment of the light emitted from said at least one light emitting diode comprises at least one optical lens.

According to an advantageous embodiment of the invention the light from the light emitting diode may be at least partly directionally aligned by means of at least one optical lens comprised in the illumination source. The light is thereby at least partly aligned and hence the requirements to the input optics may be decreased. Furthermore the optics in the illumination source may be part of the collimation optics.

According to a further advantageous embodiment of the invention the optics comprised in the illumination source may be mounted or casted as part of the light emitting diode or as part of the printed circuit board on which the light emitting diode may be mounted.

In an embodiment of the invention said means for alignment of the light emitted from said at least one light emitting diode comprises at least one protection shield.

According to an advantageous embodiment of the invention the light emitting diode comprises a light emitting center and a protection of the light emitting center, a reflector etc. The protection of the light emitting center may be shaped to facilitate at least some change of direction of the emitted light. The change of direction of the light may be part of the aligning of the light; hence the requirements to the collimation optics may not be the same, as to handle light from a light emitting diode without a light directing protection.

In an embodiment of the invention the ratio between the sum of the energy of the light focused on the respective illumination spot originating from one spatial light modulator and the sum of energy of light emitted from said at least one light emitting diode corresponding to said spatial light modulator is at least 0.1.

The higher is the coefficient of utilization, the less is the energy required by the exposure system; thereby the energy consumption for the whole stereolithography apparatus is minimized.

Furthermore the invention relates to a method of manufacturing three-dimensional objects from a light-sensitive material by the use of an apparatus.

In an embodiment of the invention said exposure system is scanned across said light-sensitive material.

According to an advantageous embodiment of the invention the exposure system is scanned across a light-sensitive material. The spatial light modulators pattern light to cure one or more illumination spots on the light-sensitive material, when the exposure system is scanned across the light-sensitive material. The exposure system is at least partly scanned across the light-sensitive material at least one time per layer of the object to be build.

Furthermore the invention relates to an exposure system of a stereolithography apparatus comprising at least two light emitting diodes emitting light with a wavelength between 200 and 100000 nm, at least two spatial light modulators with a plurality of individually controllable light modulators, input optics optically coupled to said at least two spatial light modulators, output optics optically coupled to said at least two spatial light modulators, at least one measuring unit, at least one control unit, wherein said input optics and output optics facilitates transmission of light emitted from said light emitting diodes via said individually controllable light modulators of said spatial light modulators to an illumination area, wherein said spatial light modulators enable an establishment of a pattern of the light from said input optics, according to control signals from said control unit, wherein said output optics enable focusing of the pattern of light from said at least two spatial light modulators on an illumination area, wherein said measuring unit enables measurement of the intensity of light transmitted by each individual spatial light modulator, and wherein said control unit enables regulation of the intensity of the light emitted by each individual light emitting diodes based on said measured values.

According to an advantageous aspect of the invention it is possible to turn off one or more light emitting diodes. If e.g. a layer of an object does not require light from all light emitting diodes the light emitting diodes are simply turned off. In the same way when a new layer of light-sensitive material is applied to the three-dimensional object, all light emitting diodes are turned off, which reduces the effect of stray-light on the light-sensitive material.

According to an advantageous aspect of the invention it very advantageous to be able to turn off the light emitting diodes to reduce heat generated from the light emitting diodes. The heat generated in the exposure system is to be removed to avoid damaging of electrical components in the exposure system.

According to an advantageous aspect of the invention it may be very advantageous to reduce the generation of heat as much as possible to avoid changes in structures (e.g. in the spatial light modulators, the frame in which the light emitting diodes are fastened etc.) of the exposure system because of the heat. The tolerances in the exposure system are very small; hence even tiny changes may affect the precision of the exposure system.

According to a further advantageous aspect of the invention more than one spatial light modulator is used e.g. to increase the width of the exposure system and thereby to increase the area which is possible to illuminate; hence it is possible to build larger objects or a larger number of small objects at the same time.

According to a further advantageous aspect of the invention more than one light emitting diode are used to increase the intensity of the emitted light from the exposure system. With an increased intensity of light it is e.g. possible to increase the scanning speed of the exposure system across the light-sensitive material.

According to a further advantageous aspect of the invention the spatial light modulator used to pattern the light from the light emitting diode may be equivalent to a micro light switch, a liquid crystal display, a digital micro mirror device etc.

According to a further advantageous aspect of the invention the light emitting diode may be equivalent to a laser diode, an ultra violet light emitting diode, etc. Furthermore any future developed diode or light source comparable to a light emitting diode may be used.

According to a further advantageous aspect of the invention light is understood as any type of electromagnetic wave.

In an embodiment of the invention said measured value is a representative value of the intensity of light in relation to each individual of said at least two spatial light modulators, wherein said control unit enables regulation of the intensity of light from each individual of said at least two light emitting diodes based on said measured representative value.

According to an advantageous embodiment of the invention the one or more measuring units are measuring one or more representative values from the light emitted from the light emitting diode. Such representative values may e.g. be the light intensity, the uniformity of light emitted from the light emitting diode, the temperature of the emitted light etc.

According to a further embodiment of the invention the temperature of the emitting area of the light emitting diode could also be used as basis for regulating the light emitting diodes.

According to an advantageous embodiment of the invention one or more measuring units are used to measure a representative value of the light from the light modulators of the exposure system. Using more than one measuring unit increases the speed of the measuring process and hence the total time for building an object is decreased, which is very advantageous.

In an embodiment of the invention said exposure system is part of a stereolithography apparatus and said stereolithography apparatus comprises a recoater for levelling the surface of the light-sensitive material from which the three-dimensional object is to be prepared.

In an embodiment of the invention said measuring unit comprises at least one light-sensitive sensor and the output of said light-sensitive sensor represents a representative value of the intensity of light emitted from each individual of said at least two light emitting diodes.

According to an advantageous embodiment of the invention one light-sensitive sensor may be enough to measure light from all individual light emitting diodes. The time required to measure light from each individual light emitting diode may be reduced if more than one light-sensitive sensor is used.

In an embodiment of the invention said at least one light-sensitive sensor is responsive to light within the range of 200 nm to 100000 nm.

According to an advantageous embodiment of the invention the representative value may be measured by means of any sensor adapted for reacting on light. This is advantageous because no special constructed sensors are necessary which decreases the costs.

In an embodiment of the invention said at least one light-sensitive sensor is located in the apparatus in a position which enables measuring the intensity of light before said light is patterned by said spatial light modulator.

According to an advantageous embodiment of the invention the measuring unit measures a representative value of the light before the light is patterned by the spatial light modulators. This may facilitate at least partly a dynamic measuring allowing a real time measuring of the light from the light emitting diodes. Such measuring could be facilitated e.g. by inserting a beam splitter before the light is introduced to the spatial light modulator.

In an embodiment of the invention said at least one light-sensitive sensor is located in the apparatus in a position which enables measuring the intensity of light after said light is patterned by said spatial light modulator.

According to an advantageous embodiment of the invention the measuring unit measures a representative value of the light, when the light is patterned by the spatial light modulator. This is advantageous because the measurement of a representative value of the patterned light is performed where the light is to be used. Hence by measuring a representative value when the light is patterned, the risk of further losses and thereby more or less incorrect measurements is minimized or completely eliminated.

According to a further advantageous embodiment of the invention the measuring of representative value(s) may be very easy to implement as the exposure system simply is scanned over one or more measuring units. Alternatively it is also possible to pass the one or more measuring units by all spatial light modulators of the exposure system or even measure the representative value by a combination of scanning the exposure system across the measuring apparatus and of passing the measuring unit by the spatial light modulators.

In an embodiment of the invention said control unit enables control of the intensity of light emitted from each individual of said at least two light emitting diodes based on one or more of the measured representative values.

According to an advantageous embodiment of the invention the measured representative value is used by the control unit in the control of the light emitting diodes. It is very important to have a uniform or at least close to uniform intensity of the patterned light from all the spatial light modulators used to cure a specific layer of an object. Hence when the representative value measured below the spatial light modulator A is less than the representative value measured below the spatial light modulator B, the light emitting diodes related to spatial light modulator A and B are regulated by means of the control unit, so that the representative value below the spatial light modulators A and B becomes uniform.

In an embodiment of the invention said control unit enables control of the intensity of light emitted from each individual of said at least two light emitting diodes based on one or more of the measured representative values in such a way that the intensity of light emitted from each individual of said at least two light emitting diodes is uniform.

According to an advantageous embodiment of the invention it is important to have uniform intensity of the patterned light on the illumination spots on the light-sensitive material. This may at least partly be facilitated by regulating all light emitting diodes so that each beam of the patterned light from the spatial light modulators are illuminating the illumination spots with the same intensity. Furthermore this may increase the scanning speed with which the exposure system is scanned across the light-sensitive material. This is because the exposure system does not have to "wait" for the light-sensitive material to cure by illumination spots with low intensity.

In an embodiment of the invention said control unit comprises means for controlling the intensity of light emitted from said at least two light emitting diodes by controlling the voltage or current applied to said at least two light emitting diodes.

According to an advantageous embodiment of the invention the regulation of the light from the light emitting diode may be closely related to the power consumed by the light emitting diode. Hence by controlling the level of power which the light emitting diode may consume a control of the light emitted from the light emitting diode is obtained.

In an embodiment of the invention said light-sensitive sensor is mounted on said recoater.

According to an advantageous embodiment of the invention the scanning direction of the recoater is perpendicular to the scanning direction of the exposure system. Therefore it may be very time efficient to mount the measuring unit or light-sensitive sensor on the recoater, because when the recoater is scanned across the light-sensitive material, it also passes all individual light emitting diodes.

Furthermore the invention relates to a method of manufacturing three-dimensional objects from a light-sensitive material by the use of an apparatus.

In an embodiment of the invention the intensity of light emitted from each individual of said at least two light emitting diodes is measured when the exposure system is in a state in which said exposure system is not scanning across the plane defined by the illumination area.

According to an advantageous embodiment of the invention the measuring and control of the intensity of light from the light emitting diodes is performed when the exposure system is not scanning across the light-sensitive material. It may be advantageous to perform at least either the measuring of the representative value or regulating the light emitting diodes e.g. when a new layer is recoated with light-sensitive material.

According to a further advantageous embodiment of the invention the measuring and control of the intensity or calibrating of the light from the light emitting diodes is performed e.g. when the vat or the building plate carrying the cured object is to be replaced. Furthermore it may be advantageous to perform calibration or regulation of the light emitting diodes before starting to build a new object.

According to an advantageous embodiment of the invention the exposure system is parked at the one side of the building plate or vat when it is not used. This could be in the situation where the recoater is recoating a new layer of light-sensitive material, the building plate or the vat is to be changed, etc. When the exposure system is parked it may be advantageous to measure the light from the light emitting diodes, especially when the vat or building plate is changed, because then the stray-light effect from the measuring has a minimal effect on the light-sensitive material.

According to a further advantageous embodiment of the invention the stray-light from the measuring may be reduced by means of e.g. separation plates, guards etc.

In an embodiment of the invention the measuring of a representative value from each individual of said at least two light emitting diodes is performed in one scanning movement.

According to an advantageous embodiment the measuring unit is located so that it is possible for the exposure system to scan across the measuring unit in one scanning movement. This is advantageous because the time used to measure and control the light from the light emitting diodes is decreased; hence more time is left for building three-dimensional objects.

In an embodiment of the invention said exposure system is scanned across said light-sensitive material.

According to an advantageous embodiment of the invention the exposure system is scanned across a light-sensitive material. The spatial light modulators pattern light to cure with one or more illumination spots on the light-sensitive material, when the exposure system is scanned across the light-sensitive material. The exposure system is at least partly scanned across the light-sensitive material at least one time per layer of the object to be built.

Furthermore the invention relates to a stereolithography apparatus with an exposure system, said exposure system comprising at least one printed circuit board with at least one socket and at least one light emitting diode, at least two spatial light modulators with a plurality of individually controllable light modulators, input optics optically coupled to said spatial light modulators, output optics optically coupled to said spatial light modulators, at least one control unit, at least one light source bed releasable locking said printed circuit board in such a way that the optical axis of the light emitting diode is aligned with the optical axis of said input optics, wherein said input optics and output optics facilitate transmission of light emitted from said light emitting diodes via said individually controllable light modulators of said spatial light modulators to an illumination area, wherein said spatial light modulators enable an establishment of a pattern of the light from said input optics, according to control signals from said control unit, wherein said output optics enables focusing of the pattern of light from said spatial light modulators onto an illumination area.

According to an advantageous aspect of the invention it is possible to exchange the light emitting diodes. The life time of the whole stereolithography apparatus is several times the life time of the light emitting diodes, hence exchange of the light emitting diodes is necessary.

According to a further advantageous aspect of the invention the light source bed is part of the exposure system e.g. including at least some of the input optics and hence is not easy to remove from the stereolithography apparatus. Hence it is very advantageous to be able to remove the light emitting diodes from the light bed without removing the light source bed itself.

According to a further advantageous aspect of the invention more than one spatial light modulator are used e.g. to increase the width of the exposure system and thereby to increase the area which is possible to illuminate; hence it is possible to build larger objects or a larger number of small objects at the same time.

According to an advantageous aspect of the invention the light emitting diodes are easier to handle if one or more of the light emitting diodes are connected to a printed circuit board. It may be easier and faster to exchange a printed circuit board comprising e.g. four light emitting diodes compared to exchanging four individual light emitting diodes.

In an embodiment of the invention said printed circuit board is releasable locked to said light source bed by means of said releasable locking mechanism, wherein said printed circuit board is releasable locked by means of said releasable locking mechanism in such a way that the optical axis of said at least one light emitting diode is coinciding with the optical axis of said input optics.

In an embodiment of the invention said exposure system comprises more than one light source bed.

According to an advantageous embodiment of the invention the light source bed is build as a module and hence more than one light source bed module may be used within the same stereolithography apparatus, facilitating illumination of an increased numbers of illumination spots.

According to a further advantageous embodiment of the invention the high requirements for precision in the exposure system is met by a light source bed comprising a releasable locking mechanism. Hence when the light emitting diode is placed in the light source bed, the optical axis of the light emitting diode is aligned with the optical axis for the input optics within a given tolerance and locked in this position by means of the releasable locking mechanism.

According to an advantageous embodiment of the invention no further alignment or adjustment is required for the optical axis of the light emitting diode attached to the printed circuit board to be coincided with the optical axis of the input optics when the printed circuit board is releasable locked to said light source bed.

According to a further advantageous embodiment of the invention it is easy and fast to change the printed circuit board, when it is releasable locked to the light source bed by means of the releasable locking mechanisms.

In an embodiment of the invention said stereolithography apparatus comprises an alarm for indicating malfunction or abnormalities in operation of the apparatus.

According to an advantageous embodiment of the invention an alarm indicates when it is time to change one or more of the light emitting diodes. The alarm could e.g. be in form of a sound, light (e.g. flashing or rotating), electronic data alarm etc. An alarm may be very advantageous because then the light emitting diodes are not changed without reason and no need for service personnel to check e.g. the intensity of the light emitting diodes is needed.

According to a further advantageous embodiment of the invention service personnel may by means of e.g. a computer check the light emitting diodes, e.g. how many hours they have been used, the present intensity etc; this may be very advantageous for the service personnel in order to plan maintenance of parts of the stereolithography apparatus.

In an embodiment of the invention said at least one printed circuit board comprises at least part of said input optics.

According to an advantageous embodiment of the invention the printed circuit board comprises at least part of the alignment or input optics. It may be very advantageous to provide the printed circuit board with e.g. a reflector or optical equipments because in this way e.g. the reflector or the optical equipment is allowed to be placed close to or even in contact with the light emitting diode.

In an embodiment of the invention said at least one printed circuit board comprises cooling means comprising at least one cooling surface.

According to an advantageous embodiment of the invention a cooling surface is attached to the printed circuit board to facilitate cooling of the electronics on the printed circuit board to reduce the risk of damaging the electronics or the printed circuit board.

According to a further advantageous embodiment of the invention the cooling surface is provided with a fan for optimizing the removal of heat from the printed circuit board.

According to a further advantageous embodiment of the invention holes are made through the printed circuit board to optimize the removal of heat from one side of the printed circuit board to the other side of the printed circuit board.

In an embodiment of the invention said at least one printed circuit board PCB comprises at least one set of galvanic connections, e.g. for power supply and/or controlling signals.

According to an advantageous embodiment of the invention the printed circuit board comprises electronics such as e.g. power supplies for the light emitting diodes which are also located on the printed circuit board. It may be very advantageous to distribute electronics onto smaller units or printed circuit boards. It is cheaper, if one power supply is damaged, to replace only the smaller unit or printed circuit board with the damaged component than replacing one large printed circuit board comprising a plurality of functional components.

According to a further advantageous embodiment of the invention the galvanic connections on the printed circuit boards may e.g. be carried out as a plug or a socket for transferring power directly or indirectly to the light emitting diodes or for transferring control signals for controlling electronics on the printed circuit board. The control signals may be control power supplies or relays to turn on and off the light emitting diodes.

In an embodiment of the invention said releasable locking mechanism is movable connected to said light source bed.

According to an advantageous embodiment of the invention it is possible to turn or in any other way to move the releasable locking mechanism from one position to another. This is advantageous when the printed circuit board is to be inserted or removed from the light source bed.

According to a further advantageous embodiment of the invention it is possible to remove the releasable locking mechanism from the light source bed.

According to a further advantageous embodiment of the invention the interactions between the releasable locking mechanism, the printed circuit board guiding means and the light source guiding means facilitates that the optical axis of the light emitting diode is coinciding with the optical axis of the input optics.

According to a further advantageous embodiment of the invention the light source bed may comprise guiding means which may comprise holes in the light source bed. In relation to the light emitting diode printed circuit board guidance means may be located adapted to interact with the light source bed guidance means. The printed circuit board guidance means may e.g. be bars on a printed circuit board where the light emitting diode is mounted. Hence when the bars in relation to the light emitting diode are placed in the holes in the light source bed the optical axis of the light emitting diode is aligned to the optical axis of the input optics. The releasable locking mechanism may be used to ensure that the bars in relation to the light emitting diodes are fixed into the holes in the light source bed.

According to a further advantageous embodiment of the invention the guidance means may comprise geometric figures in relation to the light emitting diode e.g. on a printed circuit board where the light emitting diode is attached to. These geometric figures are adapted to fit geometric figures in the light source bed to ensure alignment of the optical axis of the light emitting diode and the optical axis of the input optics. Such geometric figure may comprise a recess or a notch in the light source bed adapted to fit to the light emitting diode or the printed circuit board on which the light emitting diode is attached.

According to a further advantageous embodiment of the invention the guidance means described in relation to the light emitting diode and/or the printed circuit board may be used in relation to the light source bed. In the same way the guidance means described in relation to the light source bed can be used in relation to the light emitting diode and/or the printed circuit board.

In an embodiment of the invention the error of alignment of the optical axis of the light emitting diode and the optical axis of the input optics is smaller than 20 μm.

In an embodiment of the invention said light source bed, said exposure system or said printed circuit board comprise an adjusting mechanism for adjusting the position of the optical axis of said at least one light emitting diode or of the optical axis of said input optics.

According to an advantageous embodiment of the invention the light source bed may be provided with a mechanism for adjusting the printed circuit board or the printed circuit board may be provided with a mechanism for adjusting the light emitting diode manually or electrically. When e.g. a light emitting diode or a printed circuit board is exchanged and e.g. a measuring reveals that the optical axis of the light emitting diode is not completely coinciding with the optical axis of the input optics, it may be advantageous to be able to calibrate the light emitting diode or the printed circuit board until coincidence of the two optical axis occurs. Alternatively elements of the exposure system may be adjusted such as the input and or output optics.

According to a further advantageous embodiment of the invention the light emitting diodes mounted on a printed circuit board may be calibrated at another location than the stereolithography apparatus.

Furthermore the invention relates to a method of manufacturing three-dimensional objects from a light-sensitive material by the use of an apparatus.

In an embodiment of the invention said exposure system is scanned across said light-sensitive material.

According to an advantageous embodiment of the invention the exposure system is scanned across a light-sensitive material. The spatial light modulators pattern light to cure one or more illumination spots on the light-sensitive material, when the exposure system is scanned across the light-sensitive material. The exposure system is at least partly scanned across the light-sensitive material at least one time per layer of the object to be built.

In an embodiment of the invention the number of light emitting diodes is equal to or less than the number of spatial light modulators.

According to an advantageous embodiment of the invention one specific light emitting diode is dedicated to one specific spatial light modulator. This may be very advantageous because it then becomes possible to completely turn off one light emitting diode if patterned light from one of the spatial light modulators does not have to be used to build one layer of an object. Turning off one light emitting diode reduces the energy consumption as well as the production of heat.

According to a further advantageous embodiment of the invention the relationship between the light emitting diodes and the spatial light modulators is a one to one relationship. This one to one relationship allows a high degree of flexibility e.g. it enables the exposure system to turn on or off each individual spatial light modulator.

In an embodiment of the invention the number of light emitting diodes equals the number of spatial light modulators.

According to an advantageous embodiment of the invention more than one light emitting diode is used to increase the intensity of the emitted light from the exposure system. With an increased intensity of light it is e.g. possible to increase the scanning speed of the exposure system across the light-sensitive material.

According to a further advantageous embodiment of the invention the light emitting diode may be equivalent to a laser diode, an ultra violet light emitting diode, etc. Furthermore any future developed diode or light source comparable to a light emitting diode may be used.

According to a further advantageous embodiment of the invention the spatial light modulator used to pattern the light from the light emitting diode may be equivalent to a micro light switch, a liquid crystal display, a digital micro mirror device etc.

In an embodiment of the invention said input optics comprises at least one array of micro lenses.

According to an advantageous embodiment of the invention the input optics may at least partly be an array of micro lenses. The array of micro lenses may e.g. be used for focusing the light from the light emitting diodes to the apertures of the spatial light modulators.

According to a further advantageous embodiment of the invention the input optics may comprise collimation optics for collimating the light from the light emitting diodes. Furthermore additional optics may be comprised in the input optics depending on the function of the input optics.

According to a further advantageous embodiment of the invention the input optics may comprise modules of micro lenses and/or optics, hence if the exposure system comprises more than one spatial light modulator, each spatial light modulator may be attached to one input optic module.

In an embodiment of the invention said input optics comprises at least one collimation lens.

In an embodiment of the invention said input optics enables splitting the light from the light emitting diodes into multiple distinct beams.

According to an advantageous embodiment of the invention the multiple beams from the input optics is in a one to one relationship with the apertures of the one or more spatial light modulators. This may be very advantageous because then the whole light from the light emitting diodes may be used to illuminate the light-sensitive material.

According to a further advantageous embodiment of the invention the multiple beams from the input optics exceeds the number of apertures of the one or more spatial light modulators. Allowing more beams from the input optics than apertures in the spatial light modulators may add flexibility to the input optics, because the input optics may then not fit exactly to the spatial light modulators. Hence additional beams from the input optics may be used e.g. to measure the intensity of the light from the light emitting diodes.

In an embodiment of the invention said output optics comprises at least one array of micro lenses.

According to an advantageous embodiment of the invention the patterned light from the at least one spatial light modulator is focused onto the light-sensitive material by means of said array of micro lenses e.g. to ensure the highest intensity of light in the illumination spot on the light-sensitive material.

According to a further advantageous embodiment of the invention the output optics may comprise modules of micro lenses and/or optics, hence if the exposure system comprises more than one spatial light modulator, each spatial light modulator may be attached to one output optic module.

In an advantageous embodiment of the invention light is focused onto the apertures of the spatial light modulator. The spatial light modulator then establishes a pattern of the focused light by means of the light modulators. The patterned light from the spatial light modulator is then focused in illumination spots on the surface light-sensitive material by means of output optics.

In an embodiment of the invention said apparatus comprises light guiding means for guiding light emitted from one or more of said light emitting diodes to said spatial light modulators, said light guiding means being in the form of optical fibers According to an advantageous embodiment of the invention the light emitting diodes are physically placed at a certain distance from the spatial light modulators, hence it is very advantageous to use light guides such as e.g. optical fibers (e.g. made of glass, plastic, etc.) to guide light from the light emitting diodes to the spatial light modulators.

According to a further advantageous embodiment the light guides may be part of the input optics, hence the light guides may e.g. shape, align or guide light so that it is ready to be patterned by the spatial light modulators.

In an embodiment of the invention said exposure system is part of a stereolithography apparatus, said stereolithography apparatus comprising a vat.

In an advantageous embodiment of the invention the light-sensitive material is contained in a vat. A building plate may be elevated up and down in the vat containing light-sensitive material; hence when the exposure system scans across the building plate in the vat a new layer of the object is cured.

In an embodiment of the invention said control unit enables control of said exposure system.

In an advantageous embodiment of the invention the light emitting diodes and the spatial light modulators are controlled by means of a control unit. Furthermore the exposure system may be calibrated by means of the control unit.

Furthermore the invention relates to the use of a light-sensitive material in an apparatus.

Furthermore the invention relates to a method of curing a light-sensitive material in an apparatus.

Furthermore the invention relates to a three-dimensional object produced by a method.

Furthermore the invention relates to a three-dimensional object produced by use of an apparatus.

Furthermore the invention relates to a three-dimensional object.

FIGURES

The invention will now be described more in detail with reference to the figures of which FIG. 1 illustrates a simplified cross-sectional view of a stereolithography apparatus, FIG. 2 illustrates the exposure system according to an aspect of the invention, FIG. 3A-E illustrates a simplified cross-sectional view of the illumination source of the exposure system, FIG. 4 illustrates a simplified cross-sectional view of a printed circuit board comprising the illumination source, FIG. 5A-C illustrates one example of aligning light from a light emitting diode, FIG. 6 illustrates one example of measuring and controlling the exposure system, FIG. 7A-B illustrates one example of exchanging the light emitting diodes, FIG. 8 illustrates an example of a stereolithography apparatus according to an aspect of the invention, FIG. 9 illustrates a further example of a stereolithography apparatus according to an aspect of the invention, and FIG. 10 illustrates a further example of a stereolithography apparatus according to an aspect of the invention.

DETAILED DESCRIPTION

In using an apparatus according to the present invention for the manufacture of three-dimensional objects a light-sensitive material LSM is used as the material forming the object. A person skilled in the art will know of various types of light-sensitive material suitable for this purpose.

FIG. 1 illustrates a simplified cross-sectional view of a stereolithography apparatus SA for building three-dimensional objects OB according to one aspect of the present invention. The three-dimensional objects OB are built layer-wise through the curing of light-sensitive material LSM when exposed to light from the exposure system ES.

The stereolithography apparatus SA comprises a building plate BP on which one or more three-dimensional objects OB are built. The building plate BP is moved vertically into a vat V comprising light-sensitive material LSM by means of an elevator EL. A recoater REC is according to an aspect of the invention scanned across the new layer of light-sensitive material LSM to ensure uniformity of the new layer.

According to the above description the three-dimensional object OB is built by exposing a layer of light-sensitive material LSM with patterned light from the exposure system ES. A layer of the light-sensitive material LSM is cured according to the pattern of light to which it is exposed. When a first layer is cured, the building plate BP with the cured first layer of the three-dimensional object OB is lowered into the vat V and the recoater REC scans across the layer of light-sensitive material LSM in order to establish a fresh upper layer of light-sensitive material LSM. Then the exposure system ES is again scanned across the light-sensitive material LSM curing a new layer of the three-dimensional object OB.

As mentioned, the stereolithography apparatus SA comprises an exposure system ES. The exposure system ES comprises an illumination source IS (not illustrated) and an illumination unit IU (not illustrated). At least part of the exposure system ES is scanned across the light-sensitive material LSM in a scanning direction SD.

In an aspect of the invention the vat V may be equipped with means for moving the vat V such as wheels, interactions with a rail, track, forklifts etc. Hence the vat V may be removable located in the stereolithography apparatus SA, which is accessible via an opening OP, e.g. to refill the vat V with light-sensitive material LSM or for easy removal of three-dimensional objects OB from the building plate BP.

It should be noted that it is possible, e.g. by means of the illustrated elevator EL or other devices, to move the vat V vertically instead of moving the building plate BP.

The digital layer-wise representation of the three-dimensional object OB may according to an aspect of the invention be provided to the stereolithography apparatus SA via an interface unit IFU. The interface unit IFU may comprise input interfaces, such as e.g. a keyboard or pointer and output interfaces such as e.g. a screen or a printer, to handle communication via interfaces such as e.g. LAN (LAN; Local Area Network), WLAN (WLAN; Wireless Local Area Network), serial communication etc. Furthermore the interface unit IFU may comprise data processors, memories and/or means for permanent storing of data.

FIG. 2 illustrates a simplified cross-sectional view of the elements of the exposure system ES according to an aspect of the invention. According to this aspect of the invention the elements of the exposure system ES are an illumination source IS and an illumination unit IU.

According to an aspect of the invention the illumination source IS comprises at least one light-emitting diode LD and in further aspects of the invention the illumination source IS also comprises a reflector (not illustrated). In an even further aspect of the invention the illumination source IS furthermore comprises optics which may or may not be part of the input optics IO. This optics may e.g. be part of the collimation of the light from the light-emitting diode LD. Various illumination sources IS may be used according to an aspect of the invention combined or not with reflectors and optics or any combinations thereof.

The light-emitting diode LD may, according to an aspect of the invention, be located in a one to one relationship with the spatial light modulators SLM. Hence one light-emitting diode LD is illuminating at least part of the light modulators LM of the spatial light modulator SLM. Such one to one relationship may facilitate that the optical axis of the light-emitting diode OALD is coinciding with the optical axis of at least some of the input optics OAOP.

According to a preferred aspect of the invention, the light-emitting diode LD is located above the spatial light modulator SLM so that at least part of the modulators LM of at least one spatial light modulators SLM are illuminated by light from the light-emitting diode LD.

According to a further aspect of the invention the illumination source IS, hence the light-emitting diodes LD, may be located so that light guides may be necessary to transmit light from the light-emitting diode LD to at least part of the light modulators LM of the at least one spatial light modulator SLM. Such light guides may e.g. comprise optical fibres (e.g. made of polymer, plastic, glass etc.), optics, lens arrays, reflectors, etc.

The light-emitting diode LD may be of any known type or any development thereof. According to an aspect of the invention, the light emitting diode LD may be e.g. a laser diode, ultraviolet diode or any other light source emitting light in form of electromagnetic radiation.

The spatial light modulator SLM establishes a plurality of individual light beams, illuminating a plurality of illumination spots ISP together forming an illumination area.

Within the context of this description and the appended claims, with the term "illumination area" is meant an approximated plane as defined by a number of focus points also referred to as illumination spot ISP of the individual light beams.

The illumination area may form an approximated plane on the surface of the light-sensitive material LSM according to a digital layer-wise representation of the three-dimensional object OB.

According to an aspect of the invention the exposure system ES is curing the light-sensitive material LSM in a pattern according to the digital layer-wise representation thereby forming the three-dimensional object OB.

The light-sensitive material LSM may according to an aspect of the invention be a determining factor for the choice of light-emitting diode LD. Typically the light-sensitive material LSM is cured when exposed or illuminated with light of high intensity with wavelengths between 200-100000 nm. Typically light with a wavelength center frequency between 300 and 400 nm are the most optimal for curing the preferred type of light-sensitive material LSM. Of course light with other than the mentioned wavelengths may be used if special light-sensitive material LSM is required.

Other factors may also be determining for the choice of light-emitting diodes LD. Such factors could be e.g. the optics or the spatial light modulators SLM which may be damaged when exposed to light with certain wavelengths. One specific example is optics coated with a polymer and exposed either with light having a high intensity or with light having low intensity during a longer period of time; at wavelength under 250 nm the lifetime of the optics may be decreased significantly.

It should be noted that the light-sensitive material LSM is also cured when it is exposed to broad-spectrum light e.g. from the diffuse light distribution in a room, because the diffuse light distribution of a room often also contains light with wavelengths at which the light-sensitive material LSM reacts. Curing of light-sensitive material LSM from such stray-light is not desirable because it is slow and not controllable.

The intensity of the light emitted from the light-emitting diode LD may according to an aspect of the invention vary. The higher the intensity is, the shorter is the time that the light-sensitive material LSM has to be exposed to the curing light. Hereby the speed of the exposure system ES scanning over the light-sensitive material LSM may be faster. Of course other factors are also determining the scanning speed, such as the type of light-sensitive material LSM, response time in the spatial light modulators SLM. etc.

According to an aspect of the invention, the illumination unit IU comprises input optics IO, at least one spatial light modulator SLM and output optics OO. Hence light from the illumination source IS is collimated and focused by means of the input optics IO, patterned by the spatial light modulator SLM and focused on the light-sensitive material by the output optics OO.

The light is focused on at least some of the apertures of the at least one spatial light modulator SLM. The at least one spatial light modulator SLM then establishes a pattern of light onto the output optics OO, which again focuses the patterned light onto illumination spots ISP on the light-sensitive material LSM.

It should be noted that a pattern of light also includes the situation when all individual light modulators LM of the spatial light modulator SLM are in a position which either lets light through all apertures of the spatial light modulator SLM or does not let any light at all through the apertures of the spatial light modulator SLM.

The stereolithography apparatus SA comprises according to a preferred aspect of the invention more than 64 spatial light modulators SLM. It should be noted that the stereolithography apparatus SA according to an aspect of the invention is very flexible in relation to the amount of spatial light modulators SLM. Hence the number of spatial light modulators SLM may vary between 1 and e.g. up to more than 100.

According to an aspect of the invention, the individual spatial light modulators SLM may be combined in modules of four. Hence, according to a preferred aspect of the invention, when more than four spatial light modulators SLM are needed, more than one module are combined together forming the exposure system ES. In relation hereto the illumination source IS may be adapted to a module of spatial light modulators SLM, e.g. with illumination source modules of four light emitting diodes LD.

Each spatial light modulator SLM comprises according to an aspect of the invention more than 500 individually controllable light modulators LM. Of course spatial light modulators SLM with a number which differs, sometimes differs a lot, from the 500 individually controllable light modulators LM may be used. To simplify the figures, throughout this description the figures only illustrate the spatial light modulators SLM with e.g. four light modulators even though, as mentioned, there may be more than 500.

The input optics IO may according to an aspect of the invention comprise a lens system including e.g. collimation optics CO, focus optics e.g. in form of a micro lens arrays ML, lenses, etc. One example of a micro lens ML is a plate e.g. of glass on which a polymer layer is deposited. The polymer layer is then shaped in order to have one spherical surface just in front of one aperture of the spatial light modulator SLM.

The collimation optics CO is used for directionally aligning the light from the light-emitting diode LD; hence the light forming the output from the collimation optics CO is preferably parallel. The introduction of the collimation optics CO may introduce large optical losses to the exposure system ES. Furthermore an unintentional filtering of the light from the light-emitting diode LD may be introduced. The effect of the mentioned losses and filtering may in an aspect of the invention result in that not all of the light emitted from the light-emitting diode LD is present after the collimation optics CO. It is a well known problem in the art that the loss of light emitted from the light emitting area LE of a light emitting diode LD is above 50%. For this reason it is important to be able to align and collimate the emitted light.

In the present description and the appending claims the term "parallel" shall not be interpreted as parallel in a strict mathematical sense. Rather, the above term shall be interpreted as parallel having a precision within physical possible limits.

As explained, the input optics IO may also include focus optics e.g. in form of an array of micro lenses ML. The function of the micro lenses ML is to focus the collimated light onto the at least one spatial light modulator SLM. As explained below, the at least one spatial light modulator SLM comprises a plurality of apertures and it is onto or down through these apertures that the micro lenses ML are focusing the collimated light. The size of the apertures may according to an aspect of the invention be between 20-40 µm, but preferably 30 µm.

FIG. 2 illustrates an aspect of the invention where the input optics IO only comprises one array of micro lenses ML and the collimation optics CO comprises only one optical component.

The input optics may firstly collimate the light by a first stage of optical components (also referred to as collimation optics CO) and then focus the light by a second stage of optical components e.g. in form micro lenses ML. The optical components may be any combination of optical components such as e.g. mirrors or singlets, doublets or aspherics lenses etc.

Of course different combinations of the type and number of micro lenses ML and collimation lenses CO may be used in relation to the present invention. In a preferred aspect of the invention the collimation optics CO may comprise 4 lenses. One reason to implement the collimations optics CO and micro lenses ML is to optimize the efficiency of the light emitted from the light-emitting diode LD. Furthermore it should be noted that at least part of the collimation optics CO and/or micro lenses ML may be included in the illumination source IS.

The at least one spatial light modulator SLM may according to an aspect of the invention be used to pattern the collimated and focused light onto illumination spots ISP on the light-sensitive material LSM. The at least one spatial light modulator SLM comprises a plurality of individual light modulators LM also referred to as light switches, light valves, micro shutters etc.

According to an aspect of the invention, the individual controllable light modulators LM are controlled by a control unit CU. The control unit CU may control the exposure system ES according to the digital layer-wise representation of the three-dimensional object to be built. The illustrated control unit CU may control the light-emitting diode LD and the individual controllable light modulators LM of the at least one spatial light modulator SLM.

According to an aspect of the invention, controlling the light-emitting diodes LD implies to turn the light-emitting diodes LD off if e.g. only a small part of an object or a small object is to be built, which does not require patterned light from at least one spatial light modulator SLM included in the exposure system ES.

According to an aspect of the invention, the controlling of the light modulators LM in the at least one spatial light modulators SLM may be done by addressing the light modulators LM according to the pattern. The pattern may represent one layer of the three-dimensional object to be built.

In an embodiment of the invention, the illustrated control unit CU may also control other parts of the stereolithography apparatus SA than the exposure system ES. Alternatively the control unit CU may be included in other control systems in relation to the stereolithography apparatus SA.

The stereolithography apparatus SA may according to an aspect of the invention be provided with digital layer-wise descriptions of the three-dimensional object to be built. The layer-wise description of the three-dimensional object may include a support structure if the three-dimensional object requires support during the building process. For each layer of the three-dimensional object, the exposure system ES is scanned across the light-sensitive material LSM and the individual digital layer-wise descriptions of the three-dimensional object determines the pattern of light from the spatial light modulator SLM.

According to an aspect of the invention the output optics OO focuses the patterned light from the spatial light modulator SLM onto one or more illumination spots ISP on the surface of the light-sensitive material LSM. Like the input optics IO, the output optics OO may comprise more than one lens system e.g. more than one array of micro lenses ML.

The illumination spots ISP may according to an aspect of the invention be focus points located on the surface of the light-sensitive material LSM. It should be noted that the illumination spots ISP also could be located beneath the surface of the light-sensitive material LSM.

According to an aspect of the invention the size of an illumination spot ISP is between 80 and 120 µm, preferably 100 µm.

FIG. 3A-E illustrates principles of the light-emitting area LE of the light-emitting diode LD located in the illumination source IS according to an aspect of the invention. The illustrated embodiments on FIG. 3A-E are only to illustrate some of the possible principles behind the light-emitting diodes LD used in the illumination source IS. Each of the embodiments on FIG. 3A-E illustrates the light-emitting area LE, the part of the light-emitting diode LD which is emitting light.

According to an aspect of the invention the preferred light-emitting diodes LD used in the illumination source IS has a cover (not illustrated) of e.g. a polymer, glass or plastic material, covering the light-emitting area LE. This cover may be used as pre-focusing and/or pre-collimating optics of the light emitted from the light-emitting area LE. Hence according to an aspect of the invention, this cover may be part of the collimating optics CO described above e.g. in relation to FIG. 2.

Figure 1:
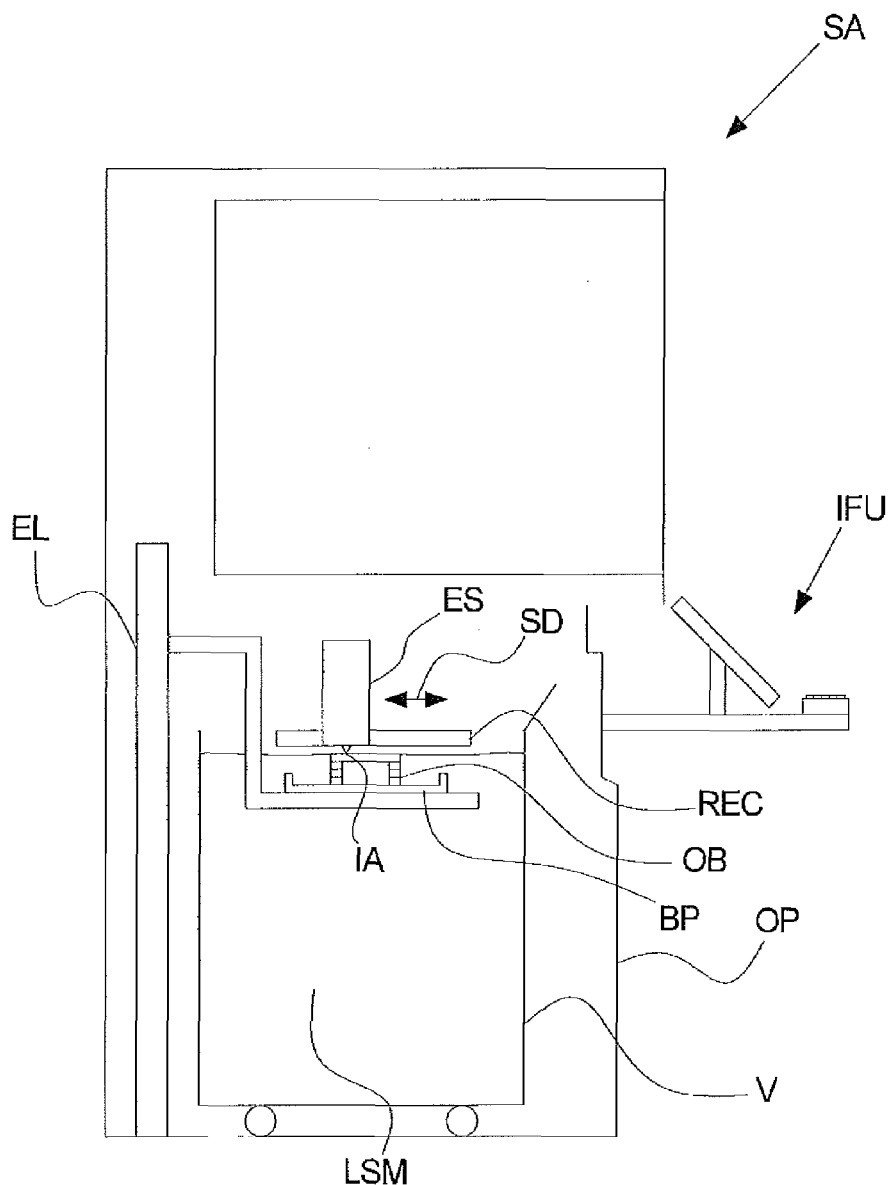
Figure 2:
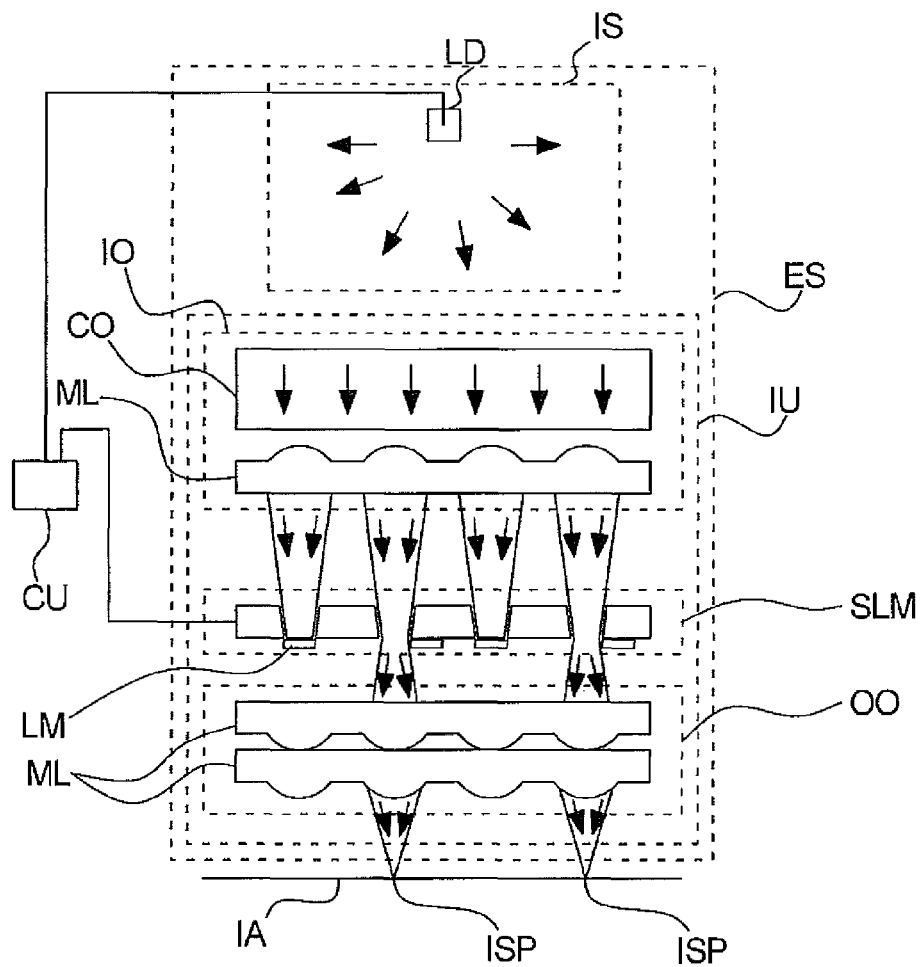
Figure 3C:
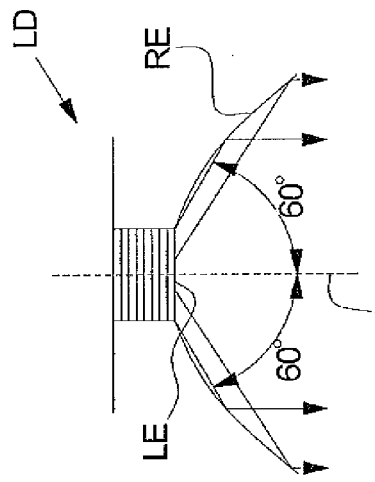
FIG. 3A illustrates an embodiment of the invention, where the light-distributing angle of light emitted from the light-emitting area LE is 60 degrees from the optical axis of the light-emitting diode OALD.
FIG. 3B illustrates an embodiment of the invention, where the light-distributing angle of light emitted from the light-emitting area LE is 90 degrees from the optical axis of the light-emitting diode OALD.

FIG. 3C illustrates an embodiment of the invention, where the light-distributing angle of light emitted from the light-emitting area LE is 60 degrees from the optical axis of the light-emitting diode OALD and wherein a reflector RE is reflecting at least part of the light emitted from the light-emitting area LE. Inserting a reflector RE may serve to several purposes. First of all the reflector RE helps to direct the light emitted from the light-emitting area LE at least partly in the same direction. Hence the reflector may be seen as a pre-aligning or pre-collimating means of the light from the light-emitting area LE. Secondly a reflector RE may be shaped or designed to reflect the light from the light-emitting area LE in certain directions which may facilitate the further treatment of the light. Moreover the use of a reflector RE may reduce the stray-light incoming from the back side of the light emitting diode LD.

Figure 3D:
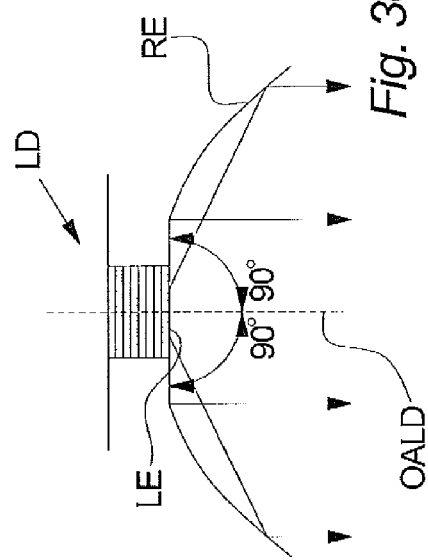
Figure 3A:
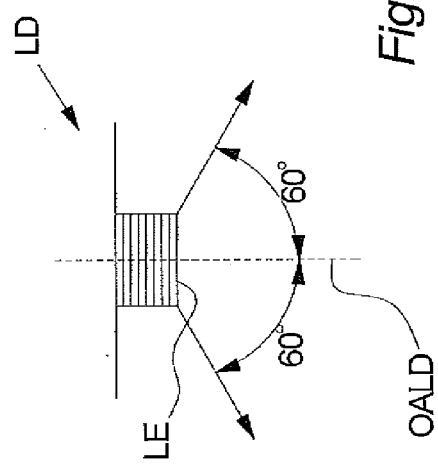
Figure 3B:
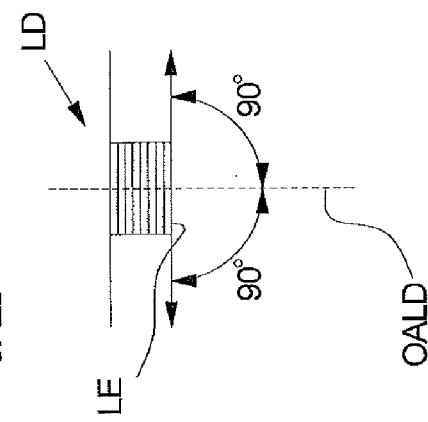

FIG. 3D illustrates an embodiment of the invention where the light-distributing angle of light emitted from the light emitting area LE is 90 degrees from the optical axis of the light-emitting diode OALD and wherein a reflector RE is reflecting at least part of the light emitted from the light-emitting area LE.

Figure 3E:
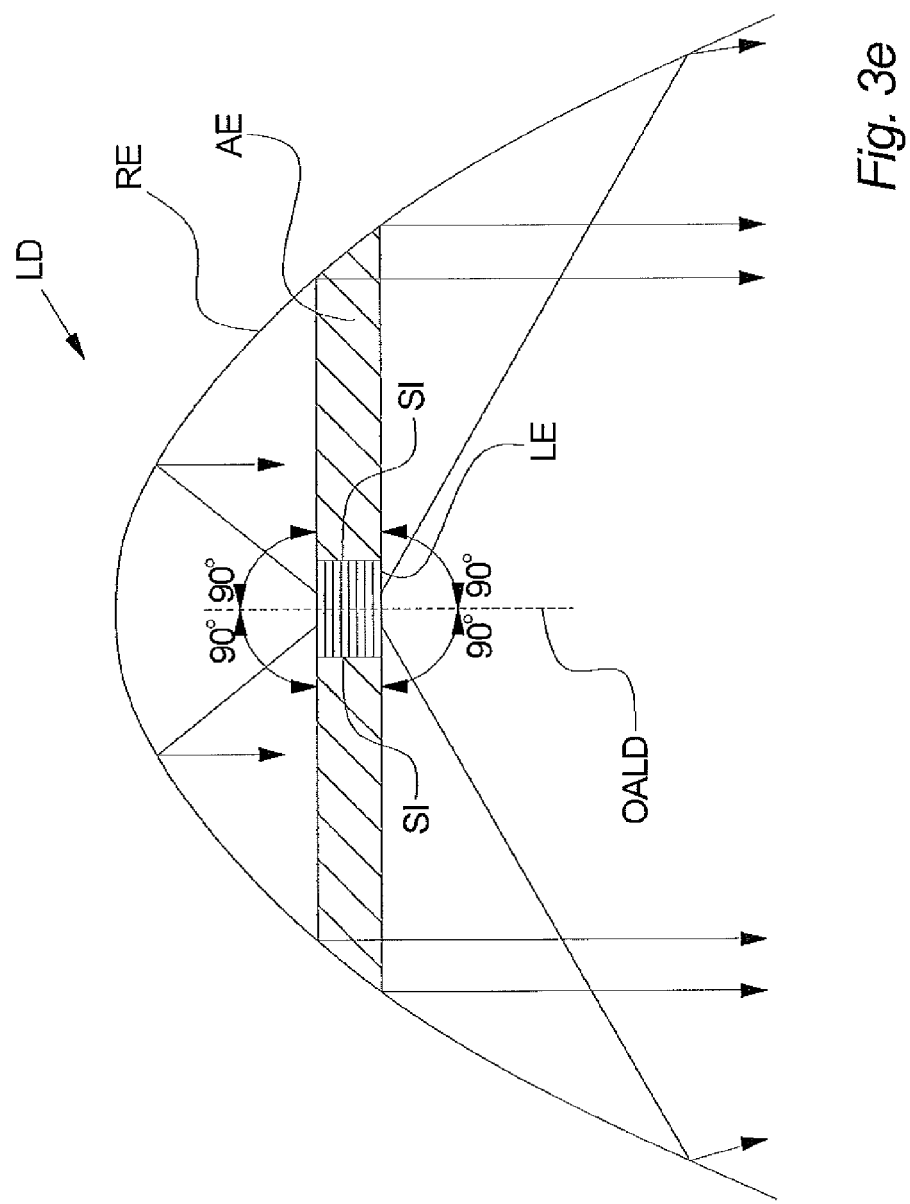

FIG. 3E illustrates an embodiment of the invention where light is emitted from both sides of the light-emitting area LE in light distributing angles up to 90 degrees from the optical axis OALD. An area AE is illustrated where no light is emitted from the light-emitting area LE, which is just to indicate that it may be very difficult to build a light-emitting diode LD emitting light from the lateral sides SI of the light-emitting area LE. If such light-emitting diode is built, it would be possible to utilise at least part of the light emitted from the side SI of such light-emitting diode.

According to an aspect of the invention the light emitting center LE of the light emitting diode LD is located as close as possible to the focus point of the reflector RE.

In relation to FIG. 3C-3E the implementation of the reflector may provide an optimized utilization of the light emitted from the light-emitting area LE of the light-emitting diode LD. Hence in these embodiments more photons per added amount of power e.g. measured in mW, mA, mV, etc. may be utilised from the light-emitting diode LID.

The reflector RE may be an integrated part of the light-emitting diode LD or the reflector RE may be placed external to the light-emitting diode LD. In the latter case the reflector RE may be part of the illumination source IS. Furthermore note that not all of the reflected light may be parallel as could be interpreted from the figures.

In a further embodiment of the invention (which is not illustrated) the illumination source IS may comprise a light-emitting diode LD with an internal reflector which together with a reflector external to the light-emitting diode LID are reflecting the light emitted from the light-emitting diode LD.

Note that in relation to FIG. 3A-3E the light-distributing angle of light emitted from the light-emitting diode LD may vary from the mentioned 60 and 90 degrees. Hence according to aspects of the invention, the light-distributing angle is smaller e.g. down to 30 or even 10 degrees from the optical axis of the light-emitting diode OALD.

Note that in relation to FIG. 3A-3E only the light-emitting area LE of the light emitting-diode LD is illustrated; hence neither e.g. the fixation nor the galvanic connections are illustrated.

Note that in relation to FIG. 3A-3E optics (not shown) may be inserted immediately after the light-emitting diode e.g. as part of the illumination source IS. Such optical elements (not shown) may preferably be part of the collimation optics CO collimating the light from the light-emitting diode LD, but may also simply be used for focusing the light from the light-emitting diode LD.

Figure 4:
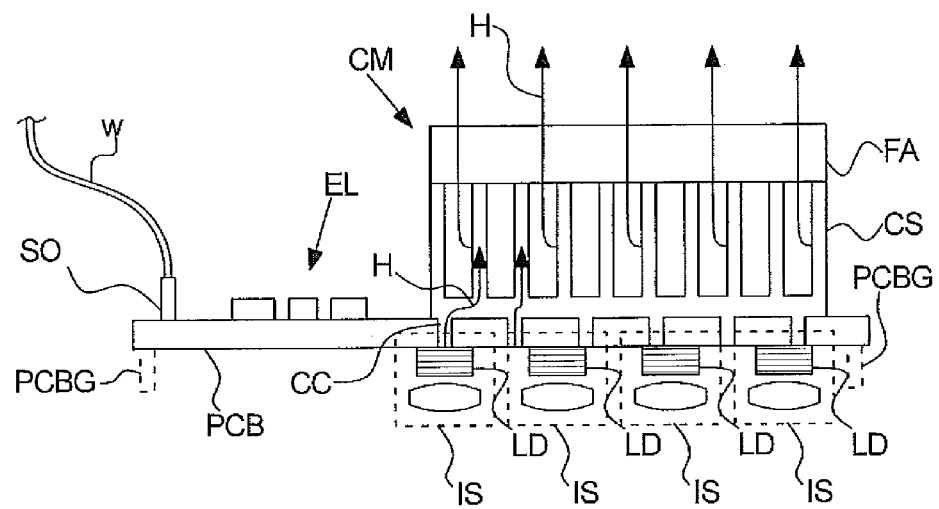

According to an aspect of the invention the illumination source IS including the light-emitting diode LD and e.g. optics is mounted on a printed circuit board PCB as illustrated on FIG. 4. The illustration on FIG. 4 is only illustrating one way of carrying out the implementing of the illumination source IS in the stereolithography apparatus SA.

As illustrated, at least one light-emitting diode LD is mounted on the printed circuit board PCB together with electronics EL, cooling means CM and at least one socket SO for supplying the printed circuit board PCB with control signals and/or power.

The printed circuit board PCB may according to an aspect of the invention comprise the power supplies to the at least one light-emitting diode LD located on the printed circuit board PCB. Furthermore at least part of the control electronics for controlling e.g. the current or the voltage supplied to the light-emitting diodes LD may also be located on the printed circuit board PCB.

In the embodiment of the invention where electronics EL is mounted on the printed circuit board PCB, it is preferred that the printed circuit board PCB also comprises sockets SO. This facilitates easy removal of wires W e.g. supplying the printed circuit board PCB with power- or control signals, hence easy removal of the printed circuit board PCB from the stereolithography apparatus SA. This could e.g. be advantageous in the situation where some of the electronics EL is damaged and the printed circuit board PCB is to be changed or repaired.

It should be noted that of course it is possible to supply the printed circuit board PCB with power and or control signals without using sockets SO, one example could be mounting wires directly on the printed circuit board PCB.

When the light-emitting diodes LD are emitting light they are producing heat H; hence it may be necessary to provide the printed circuit board PCB with cooling means CM to prevent from damaging the components mounted on or in relation to the printed circuit board PCB. Furthermore heat H from the light-emitting diodes LD may also cause structural changes in different material such as e.g. in iron, which is expanding when it is heated, having impact on the precision of the system.

In an embodiment of the invention the cooling means CM may be a combination of different arrangements working together to optimize the cooling of the components mounted on the printed circuit board PCB.

One arrangement could be one or more cooling surfaces CS optimized for transporting heat H away from the printed cooling board PCB. The one or more cooling surfaces CS may furthermore be provided with a fan FA circulating the air between the one or more cooling surfaces CS. An additional arrangement for removing heat H e.g. from the one or more light-emitting diodes LD is cooling channels CC through the printed circuit board PCB from the one or more light-emitting diodes LD to the cooling surfaces CS. Of course other cooling arrangements or elements than the above mentioned may be applied to the cooling means CM to optimize the removal of heat H from the components on the printed circuit board PCB. Such further elements could e.g. be cooling paste, water or metal for removing the heat H away from the printed circuit board PCB. Moreover some Peltier modules may be used in relation to the cooling means CM in order to control the temperature of Ion the printed circuit board PCB. It should be noted that one or more Peltier modules may be enough to control the temperature of/on the printed circuit board PCB.

Furthermore the printed circuit board may be improved with printed circuit board guiding means PCBG. These printed circuit board guiding means PCBG are only optional and whether or not these printed circuit board guiding means PCBG form part of the printed circuit board PCB, if they are necessary and their exact location on the printed circuit board PCB depend on the system or method of mounting the printed circuit board PCB in the exposure system ES. This is disclosed in more details in relation to FIGS. 7A and 7B.

Examples on a method and an illumination unit for point illumination of a medium and how to collimate light and illuminate according to embodiments of the present invention can be found e.g. in WO 98/47048, hereby incorporated by reference.

Examples on an illumination unit and a method of point illumination of a medium comprising a plurality of light emitters in the form of light guides which are arranged to illuminate at least one illumination face via a light valve arrangement according to embodiments of the present invention can be seen e.g. from WO 98/47042, hereby incorporated by reference.

An example of a rapid prototyping apparatus for the manufacturing of three-dimensional objects by additive treatment of cross-sections comprising a wholly or partially light-sensitive material is described in WO 00/21735, hereby incorporated by reference. This apparatus comprises at least one light source for illumination of a cross-section of the light-sensitive material by at least one spatial light modulator of individually controllable light modulators, wherein at least one light source is optically coupled with a plurality of light guides arranged with respect to the spatial light modulator arrangement in such a manner that each light guide illuminates a sub-area of the cross-section.

FIG. 5A-C illustrates a first aspect of the invention where the exposure system ES takes advantages of light from the light emitting diode LD emitted up to 90 degrees from the optical axis of the light emitting diode OALD.

The scope of the first aspect of the invention is to utilise as much as possible of the light emitted from the light emitting diode LD. The light distribution angle of the light from the light emitting area LE of the light emitting diode LD may vary according to which type of light emitting diode is used in the illumination source IS. Hence some types of light emitting diodes LD may emit very focused light e.g. with a light distributions angle below 20 degrees from the optical axis of the light emitting diode OALD. Other types of light emitting diodes LD may on the other side emit diffuse light with a light distribution angle above 60 degrees from the optical axis of the light emitting diode OALD.

According to the first aspect of the invention the light emitting area LE, emitting focused light e.g. with a light distributions angle below 20 degrees from the optical axis of the light emitting diode OALD, is used in the exposure system ES. It is therefore possible for a person skilled in the art to exploit the majority of the emitted light. FIG. 5A illustrates the illumination source IS according to a first aspect of the invention where light from the light emitting area LE is directed directly from the light emitting area LE towards a first optical lens OP. Since the light from the light emitting diode LD is relatively focused when emitted it may not be necessary to include any aligning optics shaping the light before the light enters the collimation optics. The first optical lens OP may therefore be part of the collimation system, collimating the light from the light emitting diode LD. Hence according to this aspect of the invention the losses in light are minimized, such losses could e.g. originate in reflectors, optics etc. because of the simple construction of the exposure system ES.

As indicated above the wider light distribution angle is, the more complicated is to exploit the majority of light emitted from the light emitting diode LD. Hence according to a further aspect of the invention, when the light emitting diode LD is emitting light in a light distribution angle above e.g. 60 degrees from the optical axis of the light emitting diode OALD, actions have to be taken to exploit at least some of the light.

Such actions could e.g. be including one or more reflectors, optics, etc. as illustrated on FIG. 5B. Here a reflector is guiding at least part of the light from the light emitting area LE towards a first optical lens OP. This first optical lens OP may according to an aspect of the invention e.g. be focusing optics, collimation optics, etc.

Hence the illumination sources IS illustrated on FIGS. 5A and 5B may be two among a plurality of different systems adapted to align light from the light emitting diode LD towards the first optical lens OP. As indicated, other illumination sources IS may be used including protection P of the light emitting diode LD as part of the aligning/guiding of light towards the input optics IO. The choice of which illumination source IS is preferred depends on the choice of light emitting diode LD and any combinations of optics, reflectors, light guides etc. may be used to optimize the amount of usable light from the light emitting diode LD.

The reflector RE illustrated on FIGS. 5B and 5C may according to an aspect of the invention be internal or external in relation to the light emitting diode. Furthermore a combination of internal and external reflectors RE may be used to optimize the utilisation of the light from the light emitting diode LD.

The illumination source IS illustrated on FIG. 5C comprises a combination of the protection P of the light emitting area LE, reflector RE and the first optics for directionally aligning the light. The aspect of the invention illustrated on FIG. 5C illustrates that the directional aligned light is directed towards the input optics IO. The input optics IO comprises one or more collimation lenses illustrated as collimation optics CO and focusing optics in form of at least one micro lens array ML.

The at least one micro lens array ML are focusing the collimated light through the spatial light modulator SLM, which by means of individual controllable light modulators LM establish a pattern of light. This pattern of light is by means of at least one array of micro lenses ML directed in the output optics OO. The output optics then focuses the patterned light into illumination spots ISP on the surface of the light-sensitive material LSM.

A control unit CU is controlling the light emitting diode LD and the spatial light modulator SLM.

Figure 6:
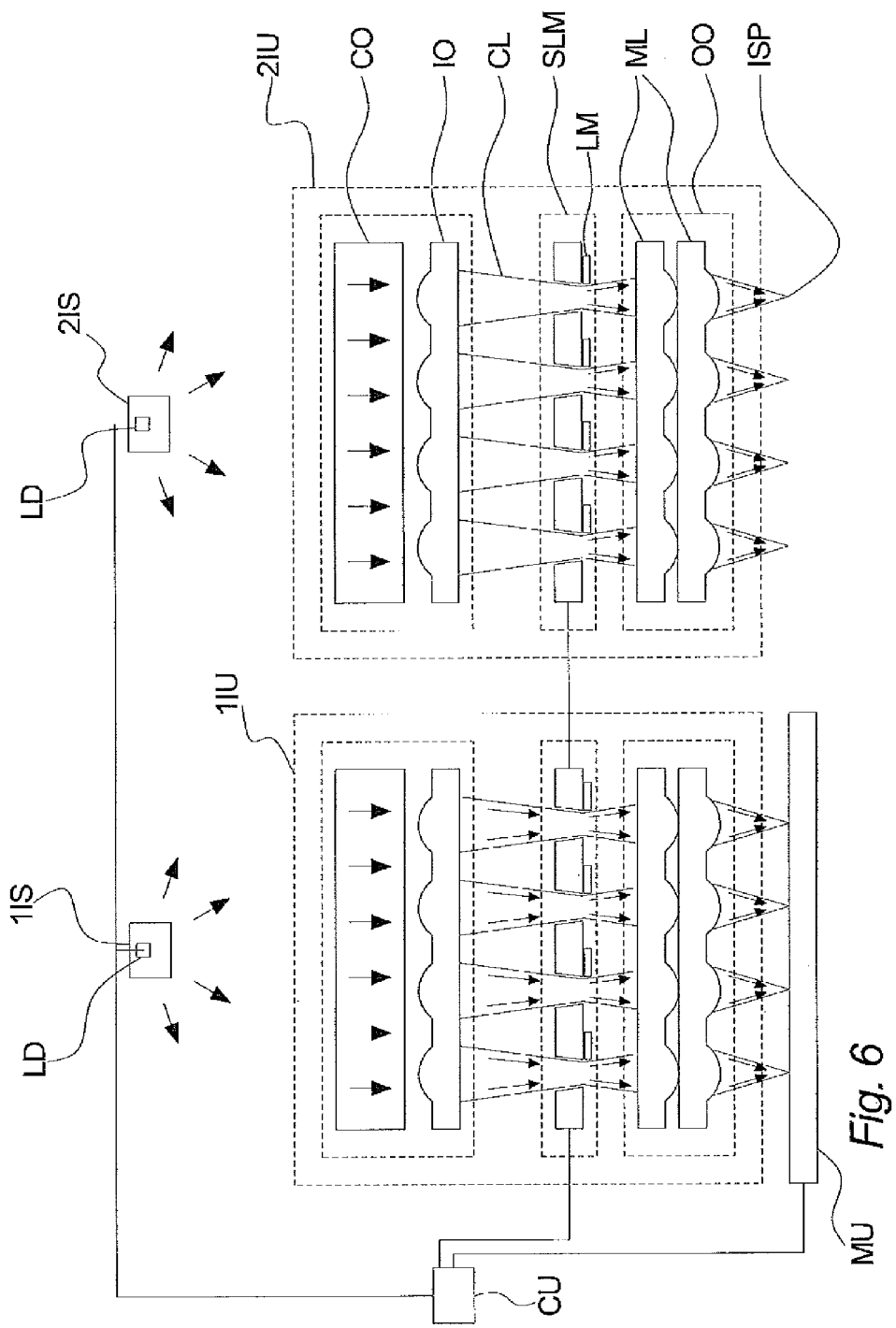

FIG. 6 illustrates a second aspect of the invention facilitating measuring and control of the individual light emitting diode LD comprised in the illumination source IS. It is an important factor in building three-dimensional objects, especially when these three-dimensional objects cover a large area (e.g. 100-300 $cm^2$), that the light-sensitive material LSM is illuminated with light having the same intensity. If the light-sensitive material LSM is not illuminated with light having the same intensity, the layers of light-sensitive material LSM are not uniformly cured.

Because the scanning speed is partly depending on the amount of light received by the light-sensitive material LSM, the scanning speed can be increased if the intensity of the emitted light is increased. Hence the higher the intensity of light is, the faster the exposure system ES can be scanned across the light-sensitive material LSM.

To simplify the explanation of the measuring and control system FIG. 6 only illustrates a first illumination source 1IS and a second illumination source 2IS. The two illustrated illumination sources 1IS and 2IS would according to a preferred aspect of the invention be part of a module comprising four illuminations units IU and four illumination sources IS. Furthermore more than one module would be coupled together forming a scanning bar according to a preferred aspect of the invention.

As illustrated on FIG. 6 the first illumination source 1IS is illuminating the first illumination unit 1IU which again illuminates a measuring unit MU. The spatial light modulator SLM illustrated on FIG. 6 have all illustrated light modulators LM in a position letting light through the spatial light modulator SLM, to let as much of the light emitted from the illumination source IS as possible be received by the measuring unit MU. The measuring unit MU may be based on any light receiving sensor or light-sensitive material electrically coupled to the control unit CU.

The measuring unit MU is measuring one or more representative values of the light from the light emitting diodes LD. The representative value may e.g. be a representation of the wavelength, intensity, position and size of the illumination spot ISP, etc. The representative value is then used as basis for controlling the individual light emitting diodes LD.

It should be noted that it is not necessary that all light modulators LM are in a position letting light through the spatial light modulator SLM, nor that the light from all light emitting diodes LM is measured, it is only preferable because it then becomes possible to obtain a more uniform illumination light-sensitive material LSM. Furthermore situations may occur where not all light emitting diodes LD have to be used to build an object, hence it would not be necessary to measure the intensity of light from these light emitting diodes LD.

Excluding light emitting diodes LD from the measuring and control procedure saves time and thereby the stereolithography apparatus SA becomes more efficient. In the same way if some of the not used light emitting diodes LD exhibit a low intensity of the emitted light compared to the light emitting diodes which are to be used, the light emitting diodes LD which are to be used may be adjusted to emit light with a higher intensity and hence it becomes possible to increase the scanning speed and thereby the time for building a three-dimensional object.

It is preferred that the measuring unit MU receives as much light from the light emitting diode LD of the illumination source IS as possible. This should not be confused with adjusting the light emitting diode LD to illuminate with the highest possible intensity e.g. by turning up the voltage or current applied to the light emitting diode LD.

It should be noted that if the light emitting diodes LD allows it, the control unit CU may control the intensity and also the wavelength of the light from the light emitting diode LD by controlling the current or voltage applied to the light emitting diode LD. Hence a control profile based on change of wavelength in relation to change of applied voltage or current may be provided.

As described above the exposure system may comprise several light emitting diodes each illuminating part of a layer of a three-dimensional object to be built. To obtain a uniform curing of the light-sensitive material LSM, each individual light emitting diode LD has to be adjusted and/or regulated.

One way of achieving this is to measure the intensity of the light received from the light emitting diode. When the intensity of the light from all individual light emitting diodes LD has been measured, each individual light emitting diode LID is adjusted so that all measured light emitting diodes LD are emitting light with the same intensity.

Both the measuring and the adjustment/regulating of the light emitting diodes LD is controlled by means of a control unit CU. The control unit may comprise a data processor or control circuit which may perform the adjustment/regulating based on different regulating algorithms such as e.g. proportional, integral and/or derivative or any combination thereof.

It should be noted that using a feedback loop when regulating/calibrating the light emitting diodes LD may not always be preferred, because this requires that a sensor is located in such way that at least part of the light from the light emitting diode LD is prevented, by the sensor, from terminating onto the light-sensitive material LSM. Furthermore this would require means to ensure that the (one or more) sensor (s) measures the same fraction of light from the individual light emitting diodes LD.

In the situation where a new layer of light-sensitive material LSM is recoated and the exposure system ES is not in use it may be advantageous to place a sensor so that the sensor receives light from the light emitting diode LD. Then a feedback loop would be established and a calibration of the light emitting diode LD may be performed. It should be noted that this could be done several times depending on the control unit CU or the desired precision of the calibration.

According to a preferred aspect of the invention the measuring unit MU may be implemented so that light from all the individual light emitting diodes LD can be measured by the measuring unit MU. Of course it is possible to implement the measuring unit MU in such a way that not all light from all light emitting diodes LD is received. But a better result would be obtained, if the measuring unit is implemented according to the preferred embodiment of the invention. It should be noted that measuring light from all the light emitting diodes LD may not be done at the same time.

The measuring unit may according to one aspect of the invention be mounted in the recoater REC (not shown). For each cured layer of light-sensitive material LSM the recoater REC is scanned perpendicular the scanning direction of the exposure system ES, hence the measuring unit is then, without any waste of time, scanning the individual light emitting diodes LD as the recoater REC recoats the new layer. According to this aspect of the invention the measuring apparatus may only be adapted to measure light from one light emitting diode at the time. Depending on the design of the exposure system ES one or more measuring units MU e.g. one or more light-sensitive sensors have to be used.

The measuring unit MU may, according to a further aspect of the invention, be mounted right underneath the location where the exposure system ES is parked when the recoater REC recoats a new layer of light-sensitive material LSM. This facilitates that a measuring can be made between each layer to be cured. The measuring unit MU may then be formed as a light-sensitive plate adapted to receive light from all light emitting diode LD at the same time. Alternatively the measuring unit may comprise one or more light-sensitive sensors which are scanned under the exposure system ES. The number of sensors may be determined by the number of scans of the light-sensitive sensors underneath the exposure system ES.

According to an aspect of the invention the diameter of the light-sensitive sensor has to be at least 9 mm to be able to measure all light from one spatial light modulator SLM.

According to an aspect of the invention the exposure system ES or the measuring unit MU comprises means for avoiding light from the exposure system to illuminate the light-sensitive material LSM when measuring the intensity of the light from the light emitting diode LS. This is done to reduce the amount of stray-light which is undesirable because it performs an uncontrollable curing of the light-sensitive material LSM.

Figure 7A:
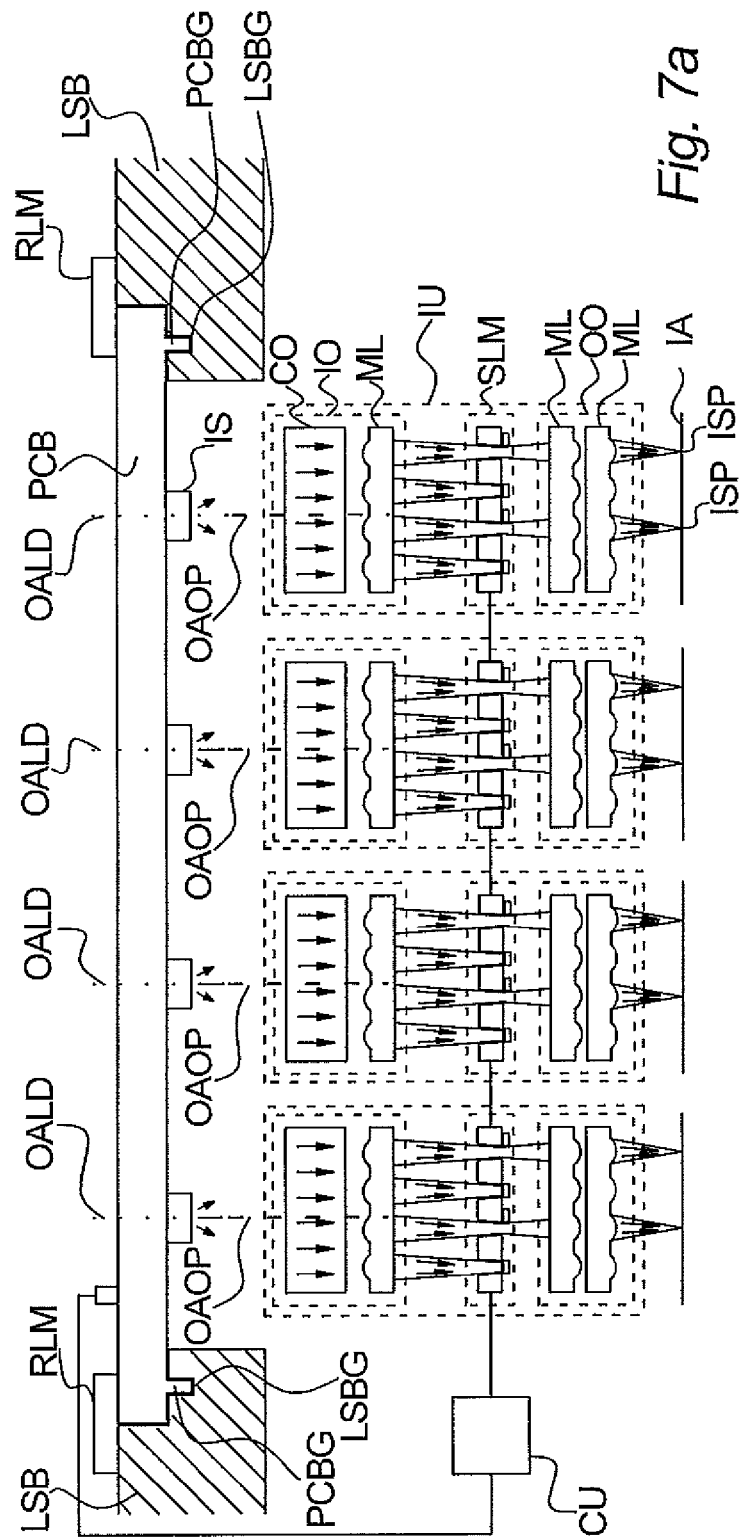
Figure 7B:
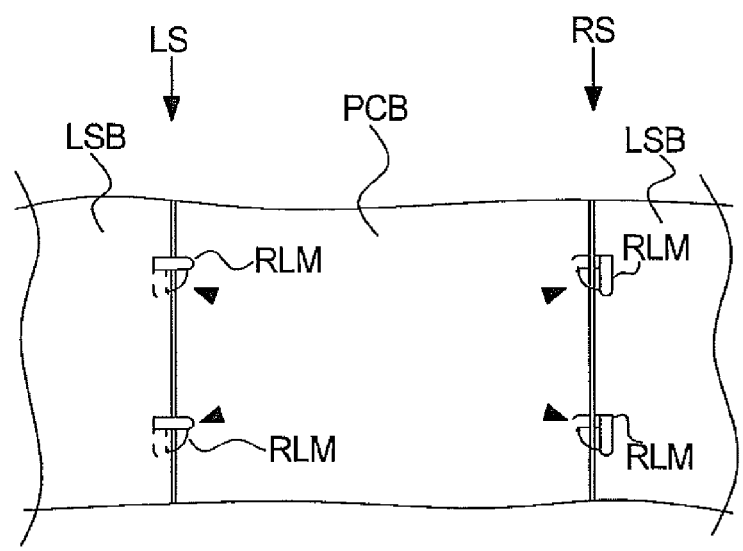

FIGS. 7A and 7B illustrates a third aspect of the invention facilitating removal of the printed circuit board PCB. The printed circuit board PCB illustrated on FIGS. 7A and 7B is similar to the printed circuit board PCB described in relation to FIG. 4. Note that only an illumination source IS including a light emitting diode LD are illustrated on the printed circuit board PCB in relation to FIGS. 7A and 7B.

The illustrated aspect of the invention illustrated on FIG. 7A may be referred to as one module. One module comprises according to an aspect of the invention four illumination sources IS and four illumination units IU.

The third aspect of the invention illustrated on FIG. 7A discloses four illumination units and a printed circuit board PCB comprising four illumination sources IS. It is advantageous to be able to exchange at least one of the light emitting diodes LD, simply because the life time of the stereolithography apparatus SA may be several times the life time of a light emitting diode LD.

According to an aspect of the invention the light emitting diode LS may be mounted on a printed circuit board PCB; in relation to this aspect of the invention it may furthermore be advantageous to be able to exchange the whole printed circuit board PCB. There may be several electrical components mounted on the printed circuit board PCB, as described in relation to FIG. 4. Each of these electrical components, including the light emitting diodes LD, represents a potential source of failure for the exposure system ES. In case just one of the electrical components fails the exposure system ES may not operate optimally, hence this electrical component or even the whole printed circuit board PCB must to be changed.

According to an aspect of the invention the releasable locking mechanism RLM may at least partly be located on a light source bed LSB. Other guidance means for facilitating securing the printed circuit board PCB may be located on the printed circuit board PCB.

The light source bed LSB may e.g. be part of the casing/cover protecting the exposure system ES.

FIG. 7A illustrates a side view of one an aspect of the invention. The light source bed LSB may be equipped with at least one but preferably four releasable locking mechanisms (only two are shown). In an aspect of the invention only one releasable locking mechanism RLM may be enough to secure the printed circuit board PCB to the light source bed LSB.

According to the aspect of the invention illustrated on FIGS. 7A and 7B, the printed circuit board guidance means PCBG on the printed circuit board PCB, may be shaped as a protruding part e.g. in form of a pawl. The light source bed guidance means LSBG on the light source bed LSB may be shaped as holes in the light source bed LSB adapted to receive the protruding part of the printed circuit board guidance means PCBG. When the at least one pawl (printed circuit board guidance means PCBG) is inserted into at least one hole (light source guidance means LSBG) the printed circuit board PCB may be secured in one position relative to the light source bed LSB.

Of course the illustrated releasable locking mechanism RLM is only one way of securing the printed circuit board PCB to the light source bed LSB. In other aspects of the invention the light source guidance means LSBG may e.g. be a recess or a hole in any geometrical form. Furthermore it may not be important e.g. if the protruding part illustrated as the printed circuit board guidance means PCBG is located on the printed circuit board PCB or on the light source bed LSB.

FIG. 7B illustrates a top view of an aspect of the invention, where a printed circuit board PCB is partly connected to a light source bed LSB. The releasable locking mechanisms RLM are movable connected to the light source bed LSB. Hence the releasable locking mechanisms RLM may e.g. be turned thereby overlapping or covering at least a part of the printed circuit board PCB. Then the printed circuit board PCB is secured to the light source bed LSB as illustrated on the left side LS of the printed circuit board PCB. On the right side RS of the printed circuit board PCB the two releasable locking mechanisms RLM are turned so that they are not overlapping or covering part of the printed circuit board PCB.

Of course the illustrated releasable locking mechanism RLM is only one way of securing the printed circuit board PCB to the light source bed LSB. In another aspect of the invention the releasable locking mechanisms RLM may e.g. turn both ways, be removable e.g. by means of a latch/notch system or screw system. Furthermore it may not be important e.g. if the movable part of the releasable locking mechanism RLM is located on the printed circuit board PCB or on the light source bed LSB.

According to a further aspect of the invention the printed circuit board PCB is located on the top of the light source bed LSB and not as illustrated in FIG. 7A lowered into the light source bed LSB.

There may be various locking systems adapted to lock the printed circuit board PCB to the light source bed LSB. According to a preferred aspect of the invention a common denominator for all locking systems which is suitable for the present exposure system ES is that, when the printed circuit board PCB is locked/secured to the light source bed LSB, the optical axis of the light emitting diode OALD is coincident with the optical axis of the input optics OAOP.

According to an aspect of the invention the maximal angle between the rays of light from the light emitting diode LD and the optical axis of at least part of the input optics OAOP is 1.5 degrees or lower.

If the two mentioned optical axes are not coinciding after locking the printed circuit board PCB onto/into the light source bed LSB, the exposure system ES may not be operated optimally. In some situations the effect of such misalignment of the optical axes may not be worth to be considered. In other situations the deviation between the two optical axes may be at least partly corrected by performing a post-adjustment or calibration of one of the optical axes. Such post-adjustment may e.g. be performed mechanically or electrically.

In the present description and the appending claims the terms "alignment" and "align" shall not interpreted as alignment in a strict mathematical sense. Rather, the above terms shall be interpreted as an alignment having a precision within physical possible limits.

As illustrated in FIG. 7A the illuminations units IU comprises input optics IO with one or more collimation lenses illustrated as collimation optics CO and focusing optics in form of at least one micro lens array ML.

The at least one micro lens array ML is focusing the collimated light through the spatial light modulator SLM, which by means of individually controllable light modulators LM establishes a pattern of light. This pattern of light is directed in the output optics OO by means of at least one array of micro lenses ML. The output optics then focuses the patterned light onto illumination spots ISP on the surface of the light-sensitive material LSM.

A control unit CU is controlling the light emitting diode LD and the spatial light modulator SLM. Furthermore the control unit may control the post-adjustment of one or both of the optical axes if necessary.

Figure 8:
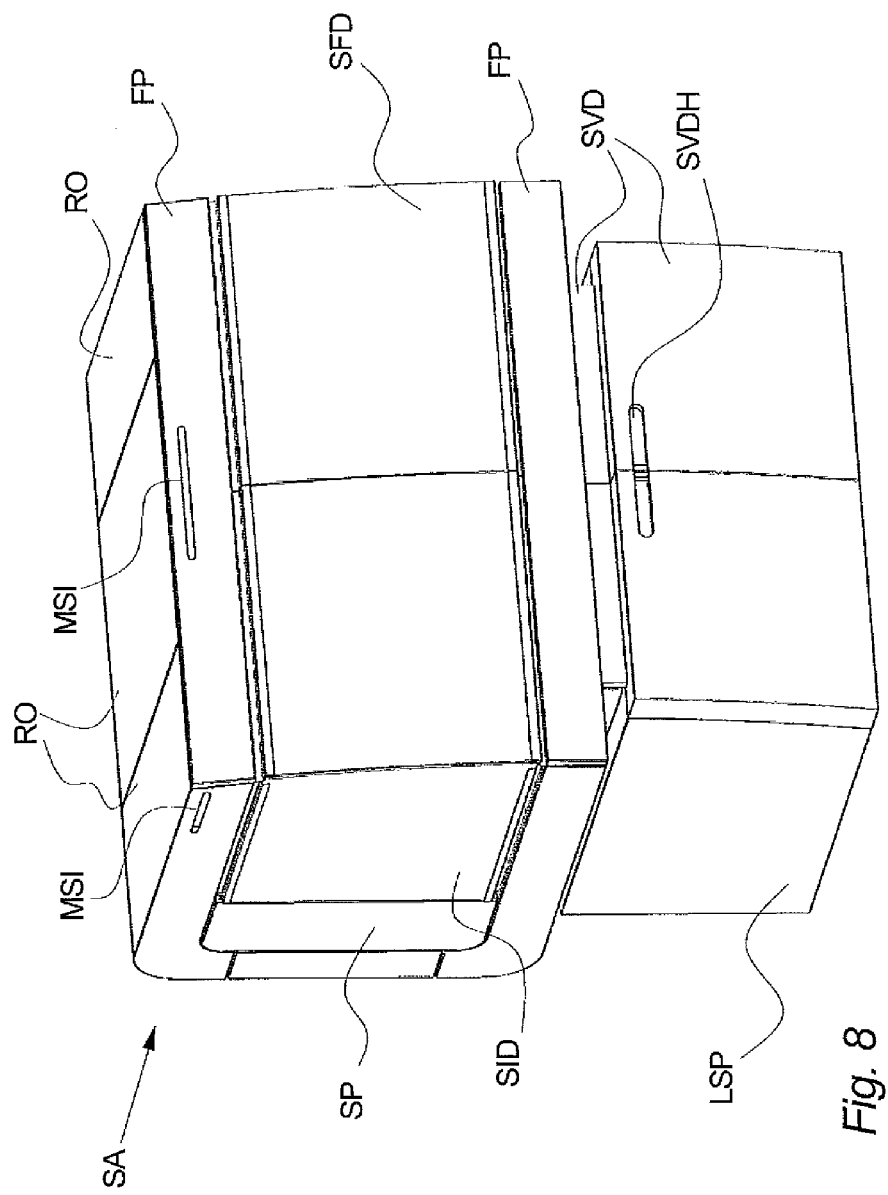
Figure 9:
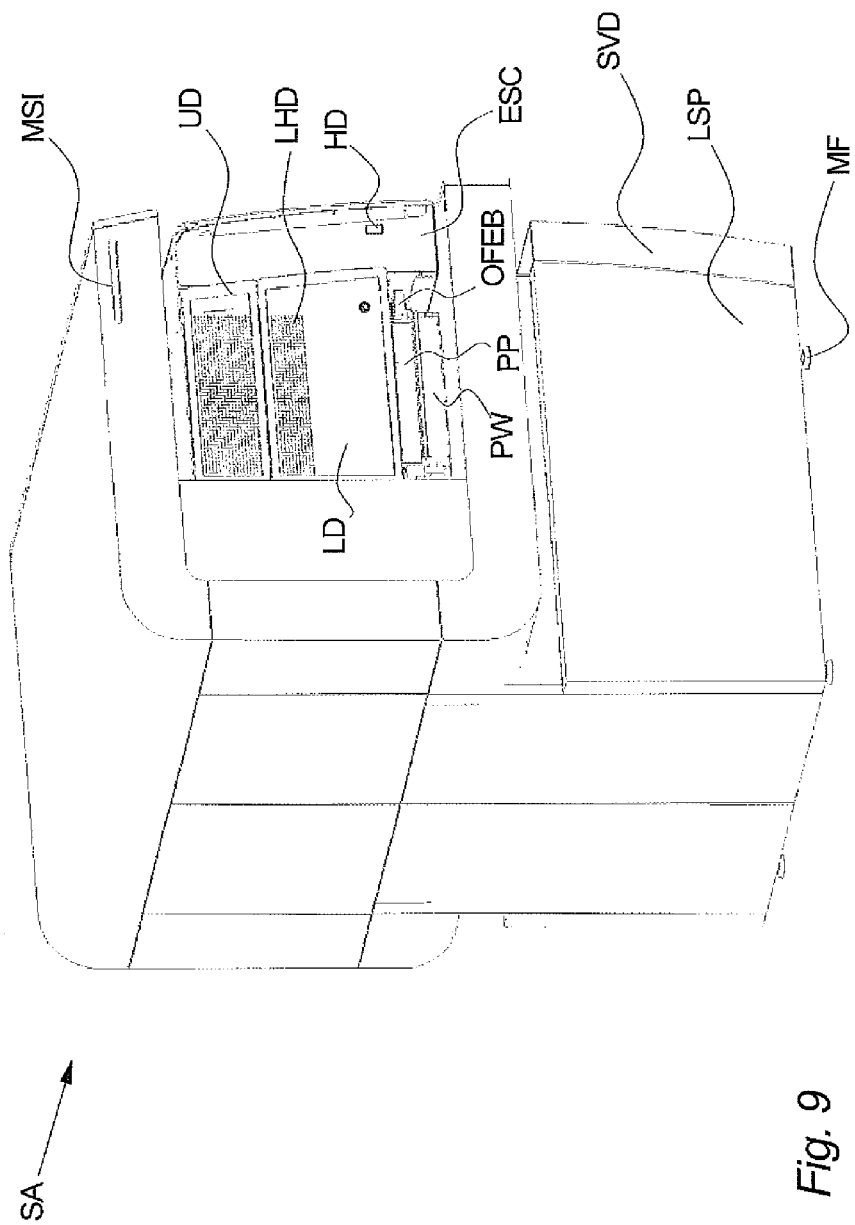

FIG. 8-10 illustrates only one possible embodiment of the stereolithography apparatus SA, it should be noted that not all below mentioned features are necessary for the stereolithography apparatus SA to operate. Furthermore it should be noted that not all details of the stereolithography apparatus SA are illustrated and that additional, not illustrated, parts may be advantageous.

FIG. 8 illustrates the stereolithography apparatus SA in a front/side view according to an aspect of the invention.

The stereolithography apparatus SA may be equipped with one or more sliding vat doors SVD, which may e.g. be opened by means of a sliding vat door handle SVDH which is activated e.g. by pushing, turning, etc. The sliding vat door SVD may give access to the vat V (not shown) by means of sliding to one side or by means of pivoting around one or more hinges.

One or more sliding front doors SFD may be positioned in relation to one or more front panels FP and side panels SP.

The sliding front door SFD may give access to the exposure system ES (not shown) by means of sliding to one side or by means of pivoting around one or more hinges. It should be noted that the sliding front doors SFD may be transparent so that the building process can be monitored without opening the sliding front door SFD.

The one or more front panels FP may extend to the side of the stereolithography apparatus SA. The one or more front panels FP may be equipped with one or more machine status indicators MSI, indicating the status (e.g. in operation, stopped, fault, etc.) of the machine or at which stage in a building process the stereolithography apparatus SA is at a given time. The machine status indicator MSI may also be located on the roof RO or side of the stereolithography apparatus SA and it may e.g. comprise a display, lamps, sirens etc.

Furthermore the stereolithography apparatus SA may be equipped with one or more side doors SID and one or more lower side panel LSP, which are not in use under normal operation of the stereolithography apparatus SA. The side doors SID and the lower side panel LSP are only dismounted or opened when parts of the stereolithography apparatus SA are to be maintained.

It should be noted that the side doors SID may according to an aspect of the invention be part of the sliding front door SFD and the lower side panel LSP may according to an aspect of the invention be part of the sliding vat door SVD.

FIG. 9 illustrates the stereolithography apparatus SA in a back/side view according to an aspect of the invention, where the side door SID and the sliding front door SFD are dismounted revealing the exposure system ES.

The stereolithography apparatus SA may according to an aspect of the invention stand on one or more machine feet MF, which may be adjustable. This may make easier installing the stereolithography apparatus SA so that when the vat V (not shown) is located in the stereolithography apparatus SA the surface of the light-sensitive material LSM and the output optics OP (not shown) are substantially parallel.

The illustrated exposure system ES comprises an upper left side door UD and a lower left side door LD used when maintaining or servicing the exposure system ES. Furthermore the exposure system comprises a lamp housing door LHD for accessing the illumination source IS (not shown). Furthermore the exposure system ES comprises a protection plate PP for protecting the different parts of the illumination unit IU (not shown). The side of the protection window PW is also illustrated on FIG. 9 together with the outer frame of the exposure bar OFEB A handle HD for releasing the protection window PW (not shown) may be located in the exposure system casing ESC.

FIG. 10 illustrates the stereolithography apparatus SA in a front view according to an aspect of the invention, where the sliding front door SFD is removed. The exposure system ES is moving in a exposure system carriage slit ESCS, when scanning across the light-sensitive material LSM (not shown). Furthermore FIG. 10 illustrates the machine frame MFR around which the machine is built up and a support base for exposure system energy chain SBEC.

The present invention exhibits notable and unexpected advantages for the infra red powder sintering of materials, whereby large surfaces can be rapidly treated with high precision.

The invention claimed is:

1. A stereolithography apparatus (SA) with an exposure system (ES), said exposure system comprising:
    at least one printed circuit board (PCB) with at least one socket (SO) and at least one light emitting diode (LD),
    at least two spatial light modulators (SLM) with a plurality of individually controllable light-modulators,
    input optics (IO) optically coupled to said spatial light modulators (SLM), output optics (OO) optically coupled to said spatial light modulators (SLM), at least one control unit (CU),
    at least one light source bed (LSB) releasable locking said printed circuit board (PCB) in such a way that the optical axis of the light emitting diode (OALD) is aligned with the optical axis of said input optics (OAOP),
    wherein said input optics (IO) and output optics (OO) facilitates transmission of light emitted from said light emitting diodes (LD) via said individually controllable light modulators (LM) of said spatial light modulators (SLM) to an illumination area (IA),
    wherein said spatial light modulators (SLM) enable an establishment of a pattern of the light from said input optics (IO), according to control signals from said control unit (CU),
    wherein said output optics (OO) enables focusing of the pattern of light from said spatial light modulators (SLM) onto an illumination area (IA),
    wherein said light source bed (LSB), said exposure system (ES) or said printed circuit board (PCB) comprise an adjusting mechanism for adjusting the position of the optical axis of said at least one light emitting diode (OALD) or of the optical axis of said input optics (OAOP) after locking the printed circuit board PCB onto/into the light source bed LSB.

2. A stereolithography apparatus (SA) according to claim 1, wherein said printed circuit board (PCB) is releasable locked to said light source bed (LSB) by means of releasable locking mechanism (RLM), and
    wherein said printed circuit board (PCB) is releasable locked by means of said releasable locking mechanism (RLM) in such a way that the optical axis (OALD) of said at least one light emitting diode (LD) is coinciding with the optical axis (OAOP) of said input optics (IO).

3. A stereolithography apparatus (SA) according to claim 1, wherein said stereolithography apparatus (SA) comprises an alarm for indicating malfunction or abnormalities in operation of the apparatus.

4. A stereolithography apparatus (SA) according to claim 1, wherein said at least one printed circuit board (PCB) comprises cooling means (CM) comprising at least one cooling surface (CS).

5. A stereolithography apparatus (SA) according to claim 1, wherein said releasable locking mechanism (RLM) is movable connected to said light source bed (LSB).

6. A stereolithography apparatus (SA) according to claim 1, wherein the error of alignment of the optical axis of the light emitting diode (OALD) and the optical axis of the input optics (OAOP) is smaller than 20 μm.

7. A stereolithography apparatus (SA) according to claim 1, wherein the number of light emitting diodes (LD) is equal to or less than the number of spatial light modulators (SLM).

8. A stereolithography apparatus (SA) according to claim 1, wherein said apparatus comprises light guiding means for guiding light emitted from one or more of said light emitting diodes (LD) to said spatial light modulator (SLM), said light guiding means being in the form of optical fibers.

\* \* \* \* \*